(12) United States Patent
Marks et al.

(10) Patent No.: US 8,687,585 B2
(45) Date of Patent: *Apr. 1, 2014

(54) ADVANCED TECHNOLOGY FRAME STRUCTURE WITH BACKWARD COMPATIBILITY

(75) Inventors: Roger Marks, Denver, CO (US); Lei Wang, San Diego, CA (US); Yair Bourlas, San Diego, CA (US); Srikanth Gummadi, San Diego, CA (US); Kenneth Stanwood, Vista, CA (US); Ron Porat, San Diego, CA (US)

(73) Assignee: Wi-LAN, Inc., Ottawa, Ontario (CA)

( * ) Notice: Subject to any disclaimer, the term of this patent is extended or adjusted under 35 U.S.C. 154(b) by 95 days.

This patent is subject to a terminal disclaimer.

(21) Appl. No.: 13/372,123

(22) Filed: Feb. 13, 2012

(65) Prior Publication Data

US 2012/0140730 A1 Jun. 7, 2012

Related U.S. Application Data

(63) Continuation of application No. 12/265,435, filed on Nov. 5, 2008, now Pat. No. 8,139,537.

(60) Provisional application No. 60/986,257, filed on Nov. 7, 2007, provisional application No. 61/030,183, filed on Feb. 20, 2008.

(51) Int. Cl.
*H04W 72/04* (2009.01)
*H04B 7/208* (2006.01)
*H04J 4/00* (2006.01)

(52) U.S. Cl.
USPC ........... 370/330; 370/344; 370/478; 370/480; 370/281; 370/208; 455/450

(58) Field of Classification Search
USPC ................. 370/206–210, 280–281, 294–295, 370/328–330, 342, 343, 344, 345, 468; 455/450, 452.2
See application file for complete search history.

(56) References Cited

U.S. PATENT DOCUMENTS 6,741,579 B1 5/2004 Choi et al.
7,639,635 B2 12/2009 Anderson et al.
(Continued)

FOREIGN PATENT DOCUMENTS

WO 01/95579 12/2001
WO 2005/039105 4/2005

OTHER PUBLICATIONS

Burchill et al., "802.16m DL Pilot Structure," IEEE C802.16m-08/193, NextWave Wireless (Mar. 10, 2007).

(Continued)

*Primary Examiner* — Candal Elpenord
(74) *Attorney, Agent, or Firm* — Volpe and Koenig, P.C.

(57) ABSTRACT

An advanced technology frame structure is described herein. The advanced technology frame structure can enhance a first technology frame structure in dimensions of time, frequency, or a combination of time and frequency. A second technology frame structure time division multiplexes second technology subframes with the first technology downlink and uplink subframes. The first technology downlink subframe can be divided into a first technology downlink subframe and one or more second technology downlink subframes. Similarly, the first technology uplink subframe can be divided into a first uplink subframe and one or more second technology uplink subframes. These principles can be expanded upon and can be applied in many communication systems.

48 Claims, 21 Drawing Sheets

(56) References Cited

U.S. PATENT DOCUMENTS

| | | |
|---|---|---|
| 7,664,087 B2 * | 2/2010 | Cho et al. ............... 370/338 |
| 7,924,748 B2 | 4/2011 | Yomo et al. |
| 8,107,986 B2 * | 1/2012 | Cho et al. ............... 455/522 |
| 2006/0018251 A1 | 1/2006 | Park et al. |
| 2006/0062196 A1 | 3/2006 | Cai et al. |
| 2006/0067205 A1 | 3/2006 | Jung et al. |
| 2006/0092892 A1 | 5/2006 | Trachewsky |
| 2006/0221872 A1 | 10/2006 | Jones et al. |
| 2006/0239264 A1 | 10/2006 | Kang et al. |
| 2006/0268760 A1 * | 11/2006 | Fang et al. ............... 370/328 |
| 2007/0064669 A1 * | 3/2007 | Classon et al. ............ 370/347 |
| 2007/0113138 A1 | 5/2007 | Kwon et al. |
| 2007/0230376 A1 | 10/2007 | Park et al. |
| 2007/0286147 A1 | 12/2007 | Wang et al. |
| 2008/0039107 A1 | 2/2008 | Ma et al. |
| 2008/0095195 A1 | 4/2008 | Ahmadi et al. |
| 2009/0013110 A1 | 1/2009 | Novotney et al. |
| 2009/0067377 A1 | 3/2009 | Talukdar et al. |
| 2009/0109914 A1 * | 4/2009 | McBeath et al. ............ 370/329 |
| 2009/0185632 A1 | 7/2009 | Cai et al. |
| 2011/0026461 A1 | 2/2011 | Tee et al. |

OTHER PUBLICATIONS

Hamiti, "IEEE 802.16m System Description Document [Draft]," IEEE 802.16m-08/003r7 (Feb. 7, 2009).

Li et al., "TDD Frame Structures for Legacy Support in 16m," IEEE C802.16m-07/242r2 (Jan. 2008).

Marks et al., "802.16m Frame Structure to Enable Legacy Support, Technology Evolution, and Reduced Latency," IEEE 802.16 Broadband Wireless Access Working Group, IEEE C802.16m-07/263 (Nov. 7, 2007).

Marsh et al., "802.16m DL Control Structure: Preamble Design," IEEE C802.16m-08/192, NextWave Wireless (Mar. 10, 2008).

Zyren, "Overview of the 3GPP Long Term Evolution Physical Layer," Freescale Semiconductor, Inc. (Jul. 2007).

* cited by examiner

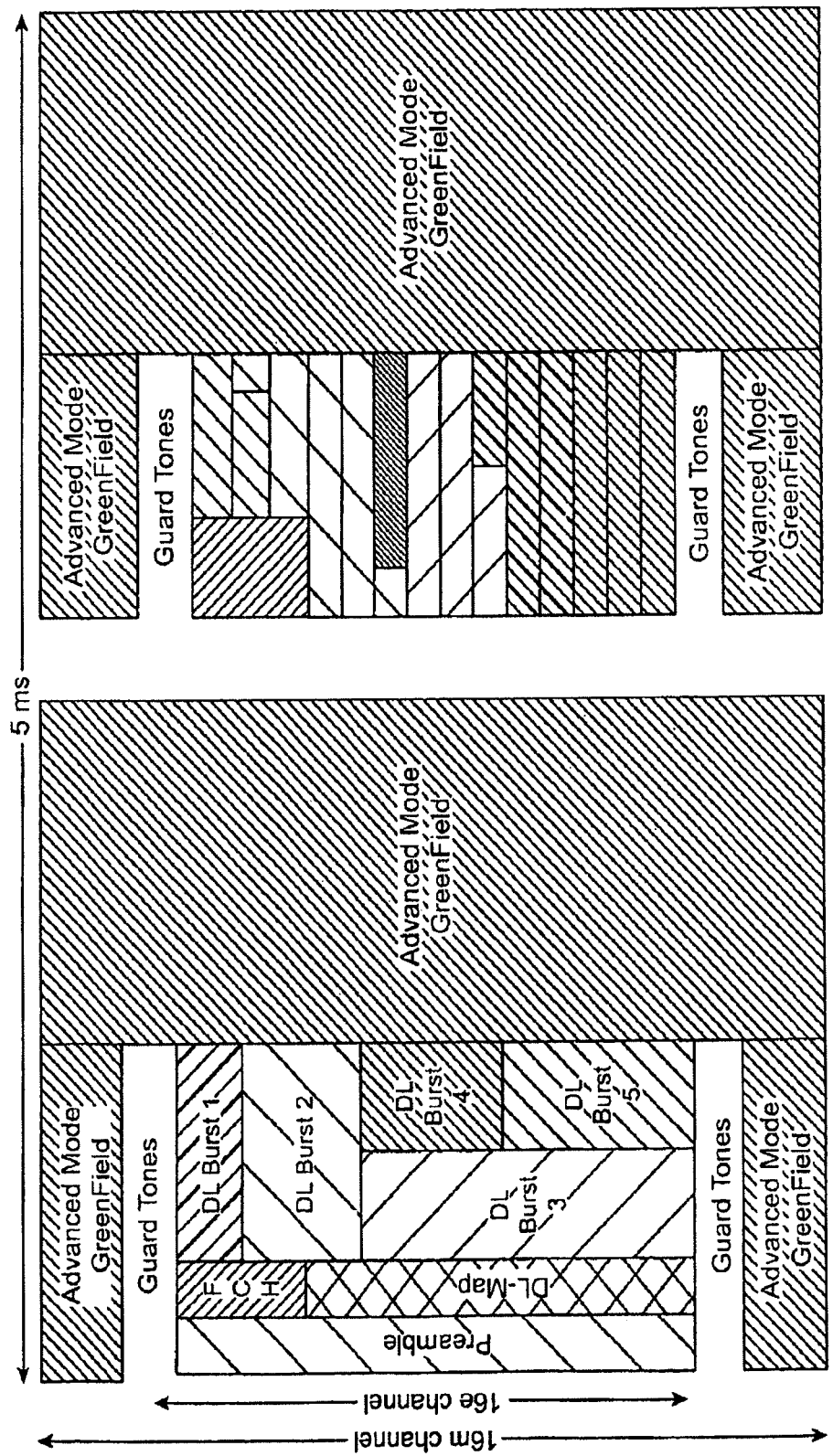

ADVANCED TECHNOLOGY FRAME STRUCTURE WITH BACKWARD COMPATIBILITY

CROSS REFERENCE TO RELATED APPLICATIONS

This application is a continuation of U.S. patent application Ser. No. 12/265,435, filed Nov. 5, 2008, which claims the benefit of U.S. Provisional Patent Application No. 60/986,257, filed Nov. 7, 2007, and U.S. Provisional Patent Application No. 61/030,183, filed Feb. 20, 2008. All of the above-referenced applications are incorporated by reference as if fully set forth.

FIELD OF INVENTION

The present disclosure relates to the field of wireless communications. More particularly, the present disclosure relates to an advanced technology frame structure.

BACKGROUND

It is a constant challenge for communication systems to integrate technological improvements in order to remain competitive with later developed communication systems implementing more advanced technology. The problem is even more apparent in wireless communication systems that have large investments in previously installed infrastructure.

A communication system risks becoming obsolete if it does not incorporate system improvements. However, the implementation of new technology into a communication system typically accommodates legacy devices. One way of supporting legacy devices is to develop a parallel infrastructure for supporting the new technology while slowly phasing out the legacy infrastructure. As can be imagined, supporting two independent systems is a costly approach to providing legacy support. Another approach is to implement updates that are backward compatible with legacy devices. However, often, the architecture of the legacy devices creates a bottleneck for system improvements.

There is a constant challenge to implement improvements into wireless communication systems, while maintaining support for legacy devices.

SUMMARY

An advanced technology frame structure with backward compatibility and associated methods and systems are described herein. As a specific example, the frame structure, methods and systems herein described can be applied in a WiMax Orthogonal Frequency Division Multiple Access (OFDMA) communication system, although their use is not limited thereto. The advanced technology frame structure supports legacy devices with little or no change to and minimal effect on the legacy devices and enables the use of new physical layer and MAC layer enhancements that are not supported by the legacy system. In one demonstrative embodiment, the advanced technology frame structure can enhance the existing frame structure in dimensions of time, frequency, or a combination of time and frequency. In another demonstrative embodiment, the advanced technology frame structure time division multiplexes advanced technology sub-frames with the existing downlink and uplink subframes. For example, the existing downlink subframe can be divided into a legacy downlink subframe and an advanced technology downlink subframe. Similarly, the existing uplink subframe can be divided into a legacy uplink subframe and an advanced technology uplink subframe.

Demonstrative embodiments of the disclosure include a first base station transmitter/receiver communicating a downlink subframe. The downlink subframe starts at a first time and ends at a second time. The downlink subframe includes a downlink legacy technology sub-subframe, a downlink advanced technology sub-subframe (ending at a third time) and an uplink advanced technology sub-subframe (beginning approximately at the third time and ending on or before the second time.) A neighboring base station transmitter transmits a limited second downlink subframe, starting at the first time and ending before or at the third time. The limited second downlink subframe includes only a legacy downlink technology sub-subframe. The neighboring base station refrains from transmitting or receiving at between the third time and the second time. In one demonstrative embodiment, the downlink legacy technology sub-subframe ends at approximately a fourth time and the downlink advanced technology sub-subframe begins at approximately the fourth time and the first base station transmitter/receiver adjusts the occurrence of the fourth time on a frame to frame basis. In one aspect the first base station transmitter/receiver further communicates an uplink subframe. The uplink subframe begins at approximately the second time and ends at a fifth time. The uplink subframe includes an second downlink advanced technology sub-subframe beginning at approximately the second time, as well as an uplink legacy technology sub-subframe and a second uplink advanced technology sub-subframe having a boundary therebetween at a sixth time, wherein the sixth time is between the second time and the fifth time. The neighboring base station transmitter/receiver may receive a limited uplink sub-subframe beginning at approximately the end of the second downlink advanced technology sub-subframe. The first base station transmitter/receiver may adjust the occurrence of the sixth time on a frame to frame basis.

Further demonstrative embodiments of the disclosure include a first base station receiving a first uplink communication from a client station operating according to a first technology format. The first uplink communication is received between a first time and a second time. The first base station also receives a second uplink communication from a second client station after the second time and before a third time. The second client station operates in accordance with a second technology format. A neighboring base station receives between the first time and the second time and between the second time and the third time. It receives a plurality of uplink communications from a plurality of client stations operating according to the first technology format.

Yet further demonstrative embodiments of the disclosure include a first base station transmitter that transmits a downlink subframe beginning at a first time and ending at a second time. The downlink subframe begins with a downlink legacy technology sub-subframe and ends with an uplink advanced technology sub-subframe. The uplink advanced technology sub-subframe begins at a third time. A neighboring base station receives a limited uplink subframe starting at the third time and ending at the second time. The neighboring base station may transmit over a limited downlink subframe beginning at approximately the second time.

Further demonstrative embodiments of the disclosure include a subframe portion of a legacy communication system that time division multiplexes a legacy sub-subframe into an advanced technology sub-subframe. A portion of the subframe portion to allocate to supporting advanced technology communications is determined. The process of time division multiplexing the subframe portion may comprise dynamically allocating a duration of the legacy sub-subframe based on the portion of the subframe portion to allocate to supporting advanced technology communications. The process of time division multiplexing the subframe portion may comprise time division multiplexing a downlink subframe portion of the legacy communication system into a legacy downlink sub-subframe and an advanced technology downlink sub-subframe. It may also comprise time division multiplexing an uplink subframe portion of the legacy communication system into a legacy uplink sub-subframe and an advanced technology uplink sub-subframe. The duration of the downlink subframe portion may be fixed and a ratio of a duration of the legacy downlink sub-subframe to a duration of the advanced technology downlink sub-subframe may be dynamically variable. The process of time division multiplexing the subframe portion may comprise time division multiplexing a downlink subframe portion of the legacy communication system into a legacy downlink sub-subframe and a first advanced technology downlink sub-subframe and a first advanced technology uplink sub-subframe. It may also comprise time division multiplexing an uplink subframe portion of the legacy communication system into a legacy uplink sub-subframe and a second advanced technology downlink sub-subframe and a second advanced technology uplink sub-subframe. The second advanced technology downlink sub-subframe may occur prior to the legacy uplink sub-subframe.

Further demonstrative embodiments of the disclosure include the legacy downlink sub-subframe including an indication of an allocation within the first advanced technology downlink sub-subframe. In other demonstrative embodiments, the legacy downlink sub-subframe includes an indication of a downlink map within the first advanced technology downlink sub-subframe. In yet another demonstrative embodiment, the first advanced technology downlink sub-subframe includes a preamble. The second advanced technology downlink sub-subframe may occur at a beginning of the uplink subframe portion of the legacy communication system. A beginning of an advanced technology frame having the time division multiplexed subframe portion may be synchronized with a beginning of a legacy frame. The time division multiplexed sub-subframes may be expanded to cover additional frequency portions.

Further demonstrative embodiments of the disclosure include a base station that supports legacy communications and advanced technology communications. The base station has several elements. It has a scheduler configured to determine the resources to allocate to advanced technology communications. It has a multiplexer configured to time division multiplex a subframe portion of a legacy communication system into a legacy sub-subframe and an advanced technology sub-subframe based on a control from the scheduler. It has a legacy resource mapper configured to allocate legacy communications within the legacy sub-subframe. And, it has an advanced technology resource mapper configured to allocate advanced technology communications within the advanced technology sub-subframe. The scheduler may determine the resources allocated based on resource allocation requests for advanced technology communications, such as, for example, based on information received from a system controller. The multiplexer may time division multiplex a downlink subframe portion distinct from an uplink subframe portion.

Further demonstrative embodiments of the disclosure include a client station that supports advanced technology communications. It has a receiver configured to receive a time division multiplexed subframe portion of a legacy communication system having a legacy sub-subframe and an advanced technology sub-subframe. It has a legacy map decoder configured to access a resource map from the legacy sub-subframe and determine a resource allocation for an advanced technology map. And it has an advanced technology map decoder configured to access the advanced technology map and determine an advanced technology resource allocation in the advanced technology sub-subframe.

Further demonstrative embodiments of the disclosure include a base station that creates a subframe designated as a downlink portion of a frame according to a first technology format. A base station inserts an uplink sub-subframe according to an alternate technology into the downlink subframe.

Further demonstrative embodiments of the disclosure include a client station that receives a frame header in a first technology format. It is parsed to determine an alternate technology format region. A resource grant message within the alternate technology format region is received. Alternate technology formatted data is either transmitted or received within the alternate technology format region according to the grant message.

Further demonstrative embodiments of the disclosure include a base station that creates a frame header for a frame. The frame header indicates a portion of the frame including an alternate technology region. The base station populates a first region of the frame with data in a first technology format. The base station populates the alternate technology region with data in an alternate technology format. The resulting frame is transmitted.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 7a-c are simplified timing diagrams of embodiments of an advanced technology frame structure having further expansion along the frequency dimension.

DETAILED DESCRIPTION OF THE PREFERRED EMBODIMENTS

An advanced technology frame structure with backward compatibility, methods for implementing the advanced technology frame structure, and apparatus for implementing and communicating using the advanced technology frame structure are described herein. The advanced technology frame structure supports legacy communications as well as advanced technology communications by time division multiplexing a legacy frame structure such that minimal or reasonable changes are required for supporting both communications.

The frame structure and apparatus described herein use improvements to legacy IEEE 802.16e Orthogonal Frequency Division Multiple Access (OFDMA) time division duplex (TDD) frame structure as an example. However, the method and embodiments described herein are not generally limited to application in an OFDMA system, nor are they limited to application in a TDD system. In the timing diagrams, the frame structure includes a time dimension and a frequency dimension. The time dimension is illustrated on the horizontal axis and the frequency dimension is illustrated on the vertical axis. The principles describe herein can be applied to other system such as other IEEE 802.16-type systems, WiBro, Wi-Fi, Long Term Evolution (LTE) and proprietary systems. In one aspect, the advanced technology frame structure supports legacy devices with little or no change to and minimal effect on the legacy devices and enables the use of new physical layer and MAC layer enhancements that are not supported by the legacy system.

In the description that follows, we often refer to a legacy and advanced technology backwards compatible frame. However, in general, the techniques described herein can be used to provide combined operation of a first technology format and one or more additional technology formats. The "legacy" system need not have been developed or deployed before the "advanced" system.

The first and second technology formats may typically have some features in common. They may differ by employing different overhead messaging, physically layer techniques, encoding techniques, access techniques, power control, physical (PHY) layer parameters, media access (MAC) layer parameters and the like.

Figure 1A:
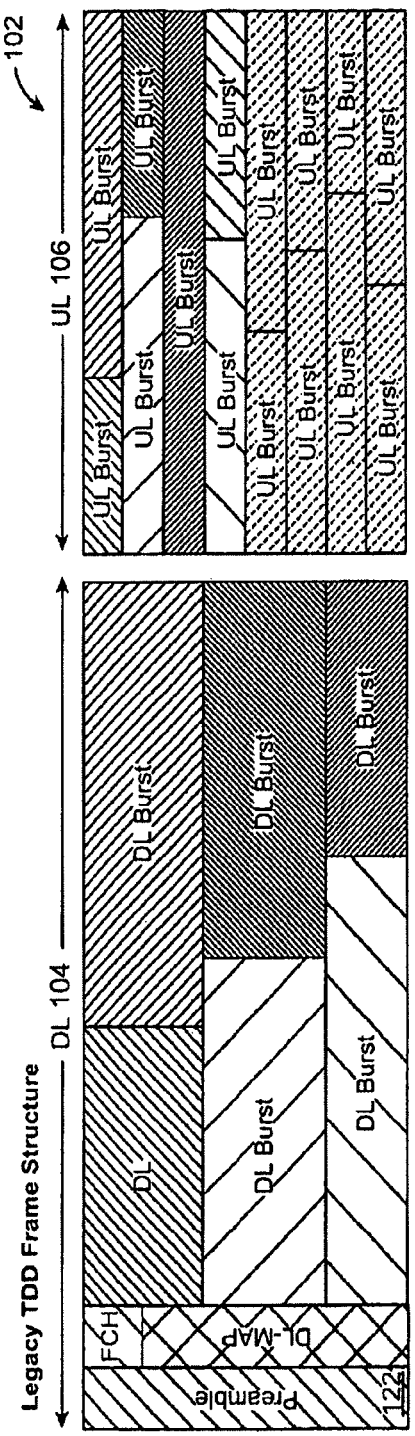
FIGS. 1a-b are simplified timing diagrams of a legacy frame structure and an embodiment of an advanced technology frame structure.
Figure 1B:
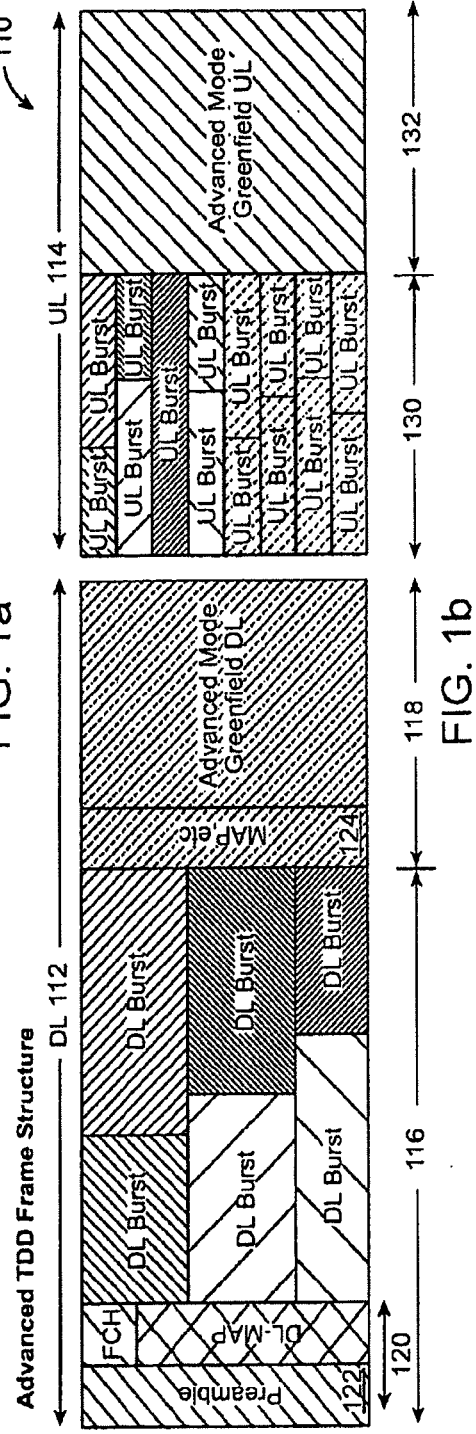

FIGS. 1a and 1b are simplified timing diagrams of a legacy frame structure 102 and an embodiment of an integrated advanced technology frame structure with backwards compatibility 110. The legacy frame structure 102 is configured as a TDD frame having a legacy downlink subframe portion 104 followed by a legacy uplink subframe portion 106. The duration of the legacy frame 102 is fixed, although the duration of each subframe portion 104, 106 may vary across distinct frames. That is, each of the subframe portions 104, 106 may occupy varied percentages of the entire frame duration across distinct frames, but the sum of the downlink subframe duration and the uplink subframe duration is constant. In some systems, the ratio of the subframe portions is set on a system wide basis.

An embodiment of an advanced technology frame structure 110 that is backward compatible with the legacy frame structure 102 is shown in FIG. 1b. For the purposes of discussion, the downlink subframe 112 and uplink subframe 114 in the advanced technology frame are shown as having the same duration as the downlink subframe 104 and uplink subframe 106 in the legacy frame, although other variations can be implemented in operation.

As shown in FIG. 1b, the advanced technology frame 110 fully supports the legacy communications by retaining the legacy downlink sub-subframe portion 116 in its downlink subframe 112 and the legacy uplink sub-subframe portion 130 in its uplink subframe 114. Specifically, in the advanced technology frame 110, the legacy downlink subframe portion 112 is time division multiplexed into a legacy downlink sub-subframe 116 and an advanced technology downlink sub-subframe 118. Similarly, the legacy uplink subframe portion 114 is time division multiplexed into a legacy uplink sub-subframe 130 and an advanced technology uplink sub-subframe 132.

The portion of each sub-subframe that is allocated to legacy communications or advanced technology communications can be fixed or variable. In one embodiment, the ratio of a duration of the legacy downlink sub-subframe to a duration of the advanced technology downlink sub-subframe is dynamically variable, and can be based on, for example, resource allocation requests for each type of communications, predetermined ratios, client station capabilities, ratios of client station capabilities, and the like or some combination thereof. Similarly, the ratio between the duration of the legacy uplink sub-subframe and the duration of the advanced technology uplink sub-subframe is dynamically variable based upon one or more factors as numerated above. Additionally, the respective ratios of legacy to advanced technology durations can be different in the downlink and uplink subframe portions.

The legacy downlink sub-subframe 116 includes a header 120. Typically, the header 120 includes a preamble 122 which is used by the client station to acquire both time and frequency synchronization among other information. In the embodiment shown in FIG. 1b, the header 120 indicates to the advanced mode client stations the location of an advanced technology resource map etc. 124 within the advanced mode downlink subframe 118. Thus, in one embodiment, a client station operating in a system using the integrated advanced TDD frame structure 110 shown in FIG. 1b tracks the preamble 122 and retrieves information from the header 120 or other element of the legacy mode downlink sub-subframe 116 regarding the location of the advanced technology resource map etc. 124. The advanced mode map etc. 124 indicates resource allocations within the advanced mode sub-subframe 118. In addition, in one embodiment, the advanced technology resource map etc. 124 also indicates resource allocations within the advanced mode sub-subframe 132.

As shown in FIG. 1, the downlink advanced technology sub-subframe 118 may include the advanced technology resource map etc. 124 that indicates the advanced technology downlink and uplink resource allocations granted to the advanced technology enabled devices. The location of the advanced technology resource map etc. 124 is indicated in a downlink legacy resource map or an extension of a legacy resource map. Thus, in one embodiment, a client station operating in a system using the integrated, backwards compatible advanced frame structure 110 as shown in FIG. 1 tracks the preamble 122 and retrieves information from the header 102 or other element of the legacy mode downlink sub-subframe as to the location of the advanced technology resource map etc. 124.

Figure 2:
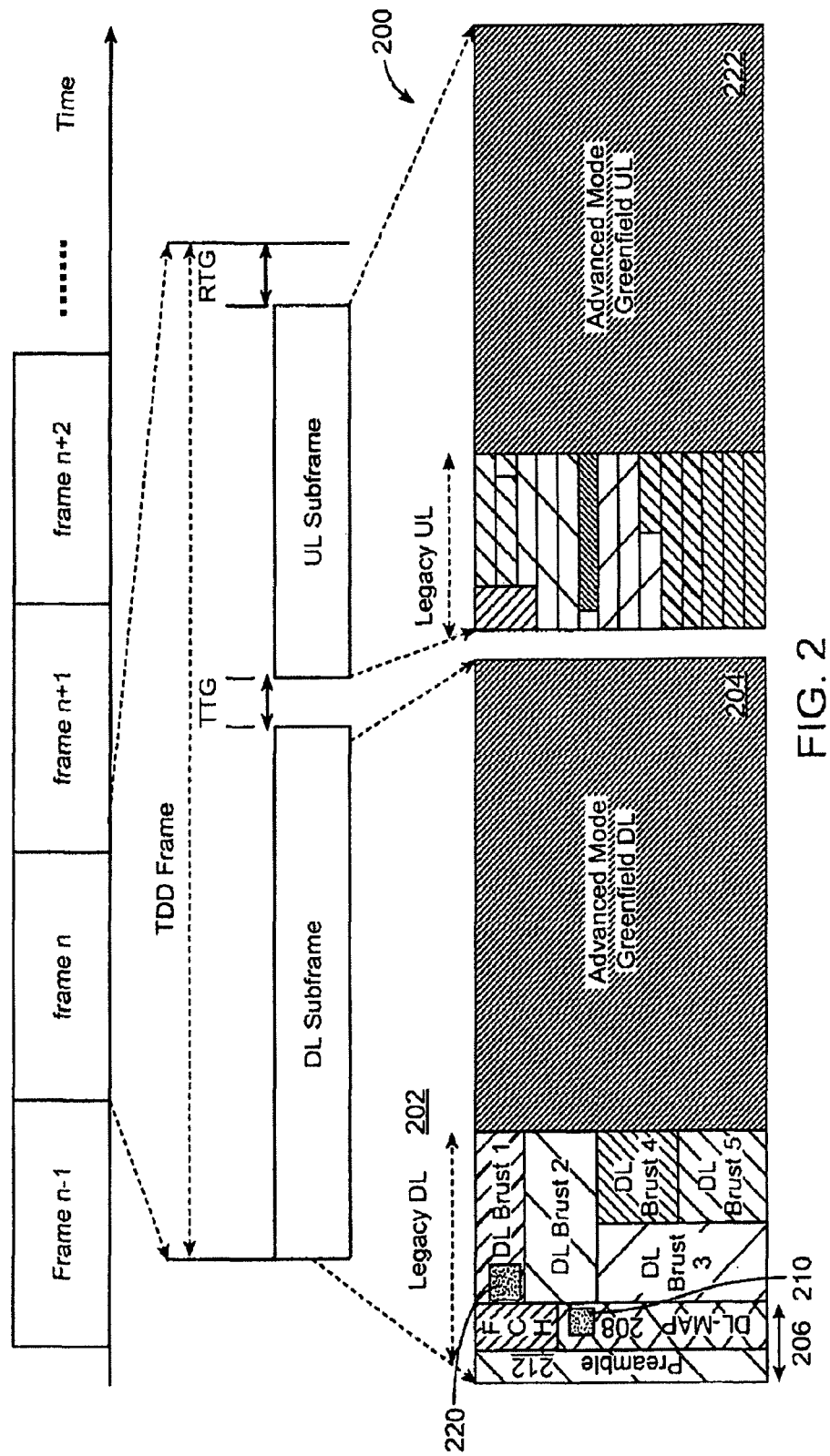
FIG. 2 is a simplified timing diagram of a detailed view of an embodiment of an advanced technology frame structure.

FIG. 2 is a simplified timing diagram of a detailed view of an embodiment of an advanced technology frame structure 200 with backwards compatibility. In FIG. 2, the advanced technology resource map etc. 124 may be limited or omitted, and the advanced technology resource allocation information can be communicated in an extension of the legacy resource map. For example, a legacy downlink resource map 208 within the header 206 can include an extended identifier or code 210 that identifies an information element 220 that identifies the resources allocated to advanced technology communications, both uplink and downlink. In another example, a legacy downlink resource map 208 can include a downlink advanced-mode granting information element. The downlink advanced-mode granting information element can grant the downlink and uplink resource allocations in the advanced technology downlink sub-subframe 204 and advanced mode technology uplink sub-subframe 222. The downlink advanced-mode pointer information element 210 and the uplink advanced-mode extended identifier or granting information element within the legacy uplink resource map 220 can be made to be backward compatible to the legacy resource maps by using extended codes or identifiers that have been reserved in the legacy system for expansion.

An advanced mode client station operating in a system using the backward-compatible advanced technology frame structure 200 acquires both time and frequency synchronization using the legacy preamble 212. In the embodiment shown in FIG. 2, downlink map information element 210 within the header 206 indicates to the advanced mode client stations the location of allocations within the advanced mode downlink and uplink sub-subframes 204 and 222. Thus, in one embodiment, a client station operating in a system using the backwards compatible advanced frame structure 200 as shown in FIG. 2 tracks the preamble 212 and retrieves information from the header 206 or other element of the legacy mode downlink sub-subframe 202, such as downlink burst 214, regarding uplink and downlink allocations within the advanced mode downlink and uplink sub-subframes 204 and 222.

FIGS. 3a and 3b are simplified timing diagrams of embodiments of advanced technology frame structures 302 and 304. FIG. 3a illustrates the advanced technology frame structure 302 similar to the one described in FIG. 1b. FIG. 3b illustrates an alternative advanced technology frame structure 304 supporting low latency communications for client stations operating in the advanced mode.

In the low latency advanced technology frame structure 304 as shown in FIG. 3b, a frame of 5 ms length, for example, is divided into first and second subframes 310 and 312 of fixed duration (e.g., 2.5 ms each subframe). Each of the first and second subframes 310 and 312 is time division multiplexed into a legacy sub-subframe 320, 330 and at least one advanced technology downlink sub-subframe 322, 332 and at least one uplink sub-subframe 324, 334, respectfully. As shown in FIG. 3b, the first subframe 310 comprises the legacy downlink sub-subframe 320, as well as both an advanced technology downlink sub-subframe 322 and advanced technology uplink sub-subframe 324, while the second subframe 312 comprises the legacy uplink subframe 330, as well as at least one advanced technology downlink sub-subframe 332 and advanced technology uplink sub-subframe 334. As shown, each subframe portion includes an advanced technology uplink sub-subframe and an advanced technology downlink sub-subframe.

The first subframe 310 is configured with a different time division multiplex ordering than the second subframe 312. As such, the advanced mode downlink sub-subframe 332 can be configured to begin at a fixed offset from the beginning of the legacy sub-subframe 320. In one embodiment, the fixed offset is configured such that a downlink sub-subframes occurs periodically, such as at 2.5 ms intervals as shown in the exemplary embodiment of FIG. 3b. In such a configuration, from the perspective of an advanced mode client station, the downlink subframes occurs periodically at a 2.5 ms offsets, or more generally, at twice the rate of the backward-compatible advanced mode frame structure 302. In such a configuration, the sub-subframe boundary within the subframes 310 and 312 can remain configurable, such as, for example, to adapt to current loading etc.

As such, the legacy frame is divided in such a way that it supports two advanced technology DL/UL pairs for each legacy DL/UL pair. As compared with the frame structure in FIG. 3a, the low latency advanced technology frame structure in FIG. 3b provides for a shorter cycle time between the downlink and uplink, thereby lowering latency. In order to further reduce the latency, the legacy frame can be divided in such a way that it supports three or more DL/UL pairs for each legacy DL/UL pair.

Low latency is achieved by reducing the time lag between successive advanced mode downlink (or uplink) sub-subframes. For example, note that in FIG. 3a a downlink transmission that enters the transmission queue just after the advanced mode map is generated may remain queued at least until the next downlink subframe. As such a downlink transmission may remain queued about 5 milliseconds (msec or ms), even when the system has ample capacity to service the transmission.

In comparison, note that in FIG. 3b, an advanced mode downlink transmission that enters the transmission queue just after the advanced mode map is generated has a much shorter maximum wait time because advanced mode downlink sub-subframes occur every 2.5 msec on average. The average latency can be yet further reduced by increasing the number of downlink sub-subframes that occur within any legacy sub-frame. These same principles apply directly to uplink advanced mode transmissions.

Figure 4:
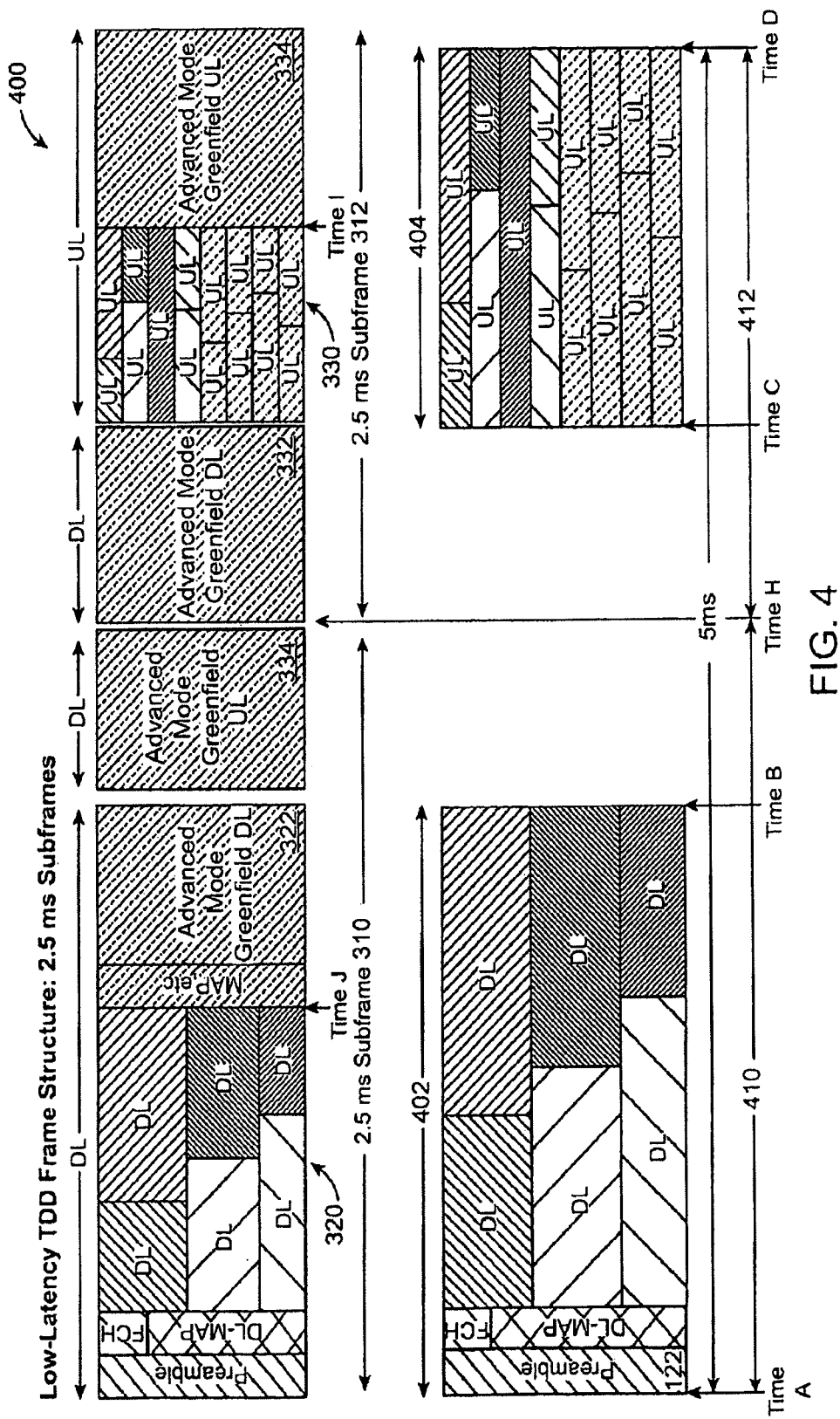
FIG. 4 is a simplified timing diagram of time synchronization between embodiments of advanced technology frame structures.

FIG. 4 is a simplified timing diagram of time synchronization between embodiments of advanced technology frame structures. The upper timing diagram illustrates the advanced technology frame structure with low latency. The lower timing diagram illustrates an example of a legacy frame structure synchronized to the advanced technology frame structure. The legacy frame can be, for example, a frame generated by a neighboring base station lacking the capability to support advanced technology communication. These co-existence techniques can be critical when dual mode base stations operate in close proximity to single mode base stations.

As shown in FIG. 4, the beginning of the low latency, backwards compatible advanced technology frame 304 transmitted by a first base station is time synchronized with the beginning of a compatible legacy frame 400 transmitted by a second, neighboring base station. Alternatively, advanced technology frame 304 and the legacy frame 400 may be transmitted by a common base station but on different frequency bands/channels. The first base station transmitter and second base station transmitter neighbor one another when the coverage area corresponding to each base station is within a localized geographical region or when the two transmitters are substantially co-located and operating in different frequency bands/channels. The legacy frame refrains from having resources allocated during the first advanced technology uplink sub-subframe and the second advanced technology downlink sub-subframe in order to mitigate the deleterious effects of collisions between uplink and downlink transmissions.

Transmission or receptions within the various subframes may terminate at or before the end of the corresponding subframe. During periods of heavy traffic, communications may occur throughout an entire subframe. If the system is not fully loaded, communications may not occur over some portion of a subframe.

The duration over which communications are conducted within the limited subframes 410 and 412 is reduced to a limited downlink sub-subframe 402 and a limited uplink sub-subframe 404 respectively. As shown in FIG. 4, the beginning of the subframe 310 and the beginning of the limited legacy downlink subframe 410 are synchronized to time A. The sub-subframe 402 ends at time B, coinciding approximately with the beginning of the uplink advanced mode sub-subframe 324. Likewise the sub-subframe 322 ends at time B. The end of uplink advanced mode sub-subframe 324 coincides with the end of the downlink subframes 310 and 410 at time H.

In a similar manner, the downlink advanced mode sub-subframe 332 begins at the beginning of the uplink subframes 312 and 412, at time H. The downlink advanced mode sub-subframe 322 ends at time C. The sub-subframe 404 and the sub-subframe 330 are synchronized to begin at time C. The sub-subframe 404, the subframe 412, the subframe 312 and the sub-subframe 334 terminate at time D or earlier.

In some embodiments, the occurrence of time B and time C is configurable, typically as a system wide parameter. The ordering of the uplink legacy sub-subframe 330 and uplink advanced mode sub-subframe 334 can be reversed. The time at which the downlink legacy sub-subframe 320 ends and the downlink advanced mode sub-subframe 322 begins, indicated as time J on FIG. 4, can be configurable and may change from frame to frame and from base station to base station. For example, if the time J is configurable on a frame to frame basis, it may be changed periodically, such as every second, every frame, based on loading or the like. Likewise the time at which the uplink legacy sub-subframe 330 ends and the uplink advanced mode sub-subframe 334 begins, indicated as time I on FIG. 4, can be configurable and may change from frame to frame and from base station to base station.

Figure 5:
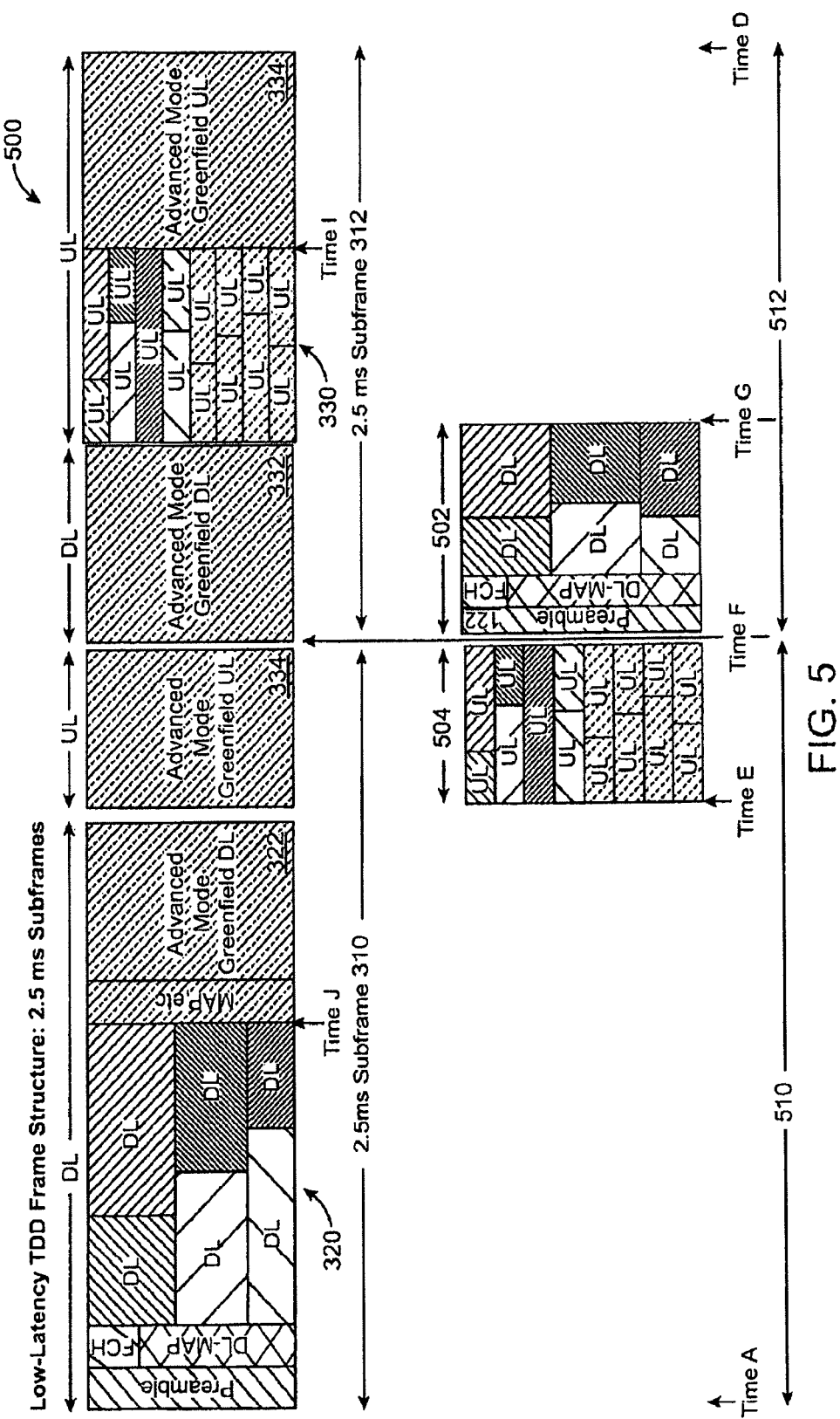
FIG. 5 is a simplified timing diagram of time synchronization between embodiments of advanced technology frame structures.

FIG. 5 is a simplified timing diagram of alternative time synchronization between embodiments of advanced technology frame structures. In the embodiment of FIG. 5, the timing of the advanced technology frame is offset from the frame timing for the legacy frame 500 by some fixed amount. The limited uplink subframe 510 includes a limited sub-subframe 504 that is synchronized to occur during the advanced technology uplink sub-subframe 334 within the downlink subframe 310. The limited legacy downlink subframe 512 includes a limited sub-subframe 502 that is synchronized to occur during the downlink advanced technology sub-subframe 332 within the uplink subframe 312. In some systems, the configuration shown in FIG. 5 may be advantageously applied as the ratio of resources dedicated to the advanced mode operation increases. Note that in typical systems, the uplink sub-subframe 504 corresponds to the frame before the frame that includes the downlink sub-subframe 502.

Thus, the beginning of the sub-subframe 332 and the beginning of the legacy downlink sub-subframe 502 are synchronized to begin a time F. The legacy downlink transmissions in the sub-subframe 504 are terminated at time G or earlier. Likewise transmission in the sub-subframe 332 are terminated at time G or earlier. In a similar manner, the legacy uplink sub-subframe 504 and the sub-subframe 334 are synchronized to begin a time E. The legacy uplink transmissions in the sub-subframe 504 are terminated at time F or earlier. Likewise, the advanced mode uplink transmissions in the sub-subframe 334 are terminated at time F or earlier.

Figure 3:
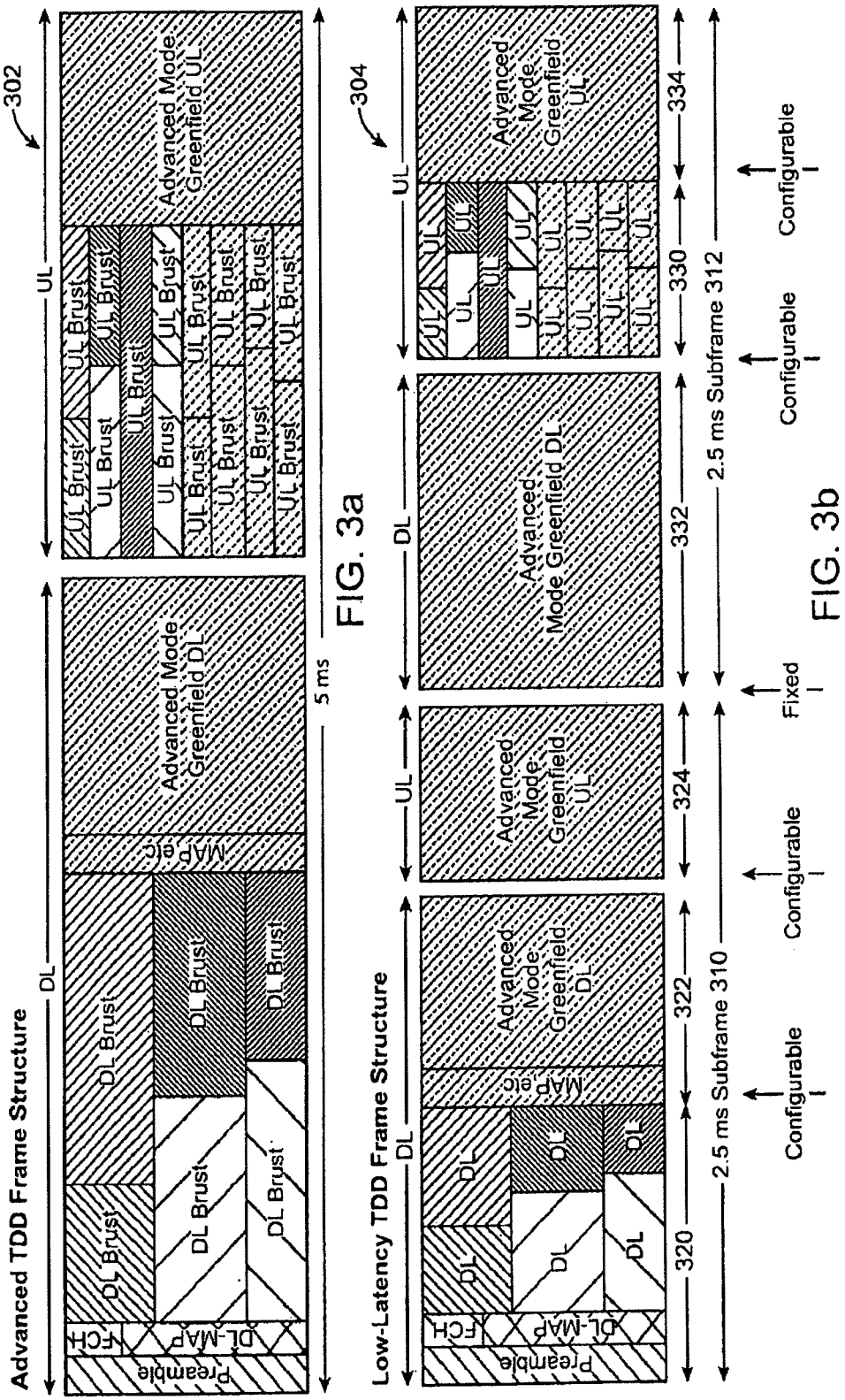
FIGS. 3a-b are simplified timing diagrams of embodiments of advanced technology frame structures.

FIGS. 6a-d are simplified timing diagrams of alternative embodiments of an advanced technology frame structure as seen from different device perspectives. FIGS. 6a-6d do not specify or otherwise label the advanced technology sub-subframes as supporting downlink or uplink communications. Although FIGS. 1-5 illustrate specific examples of advanced uplink and advanced downlink configurations, the advanced technology region is not limited to any particular configuration, and the advanced technology region can be divided into virtually any number of uplink and downlink sub-subframes and such advanced sub-subframes may occur in any order. For example, as shown in FIG. 2, the advanced technology downlink region can occupy substantially all of the advanced technology sub-subframe immediately following the legacy downlink sub-subframe. Alternatively, as illustrated in FIG. 3b, the advanced technology sub-subframe can be divided into a downlink/uplink pair, triple etc. Other configurations can be, of course, implemented to be tailored to specific communication needs in a system.

Typically, when the advanced mode technology is initially deployed, legacy usage greatly exceeds advance technology usage. As time moves forward, legacy usage decreases and is eventually phased out. According to the embodiments shown in FIGS. 1b and 2, even after the usage of the legacy technology is fully phased out, the advanced mode operation continues to use one or more elements of the legacy header and, thus, these legacy elements continue to be transmitted even after use of the legacy system has been phased out.

For example, according to the embodiment shown in FIG. 2, a client station operating in advanced technology mode uses both the legacy preamble as well as information embedded in the legacy downlink map and legacy uplink map. In the embodiment shown in FIG. 1b, although a client station operating according to the advanced mode technology does not use the legacy header to acquire mapping etc. information, it uses the legacy header for some elements, such as the preamble. Thus, according to the embodiment shown in FIGS. 1b and 2, elements of the legacy header are used in the advanced technology mode operation even after legacy operation has been phased out.

Figure 6A:
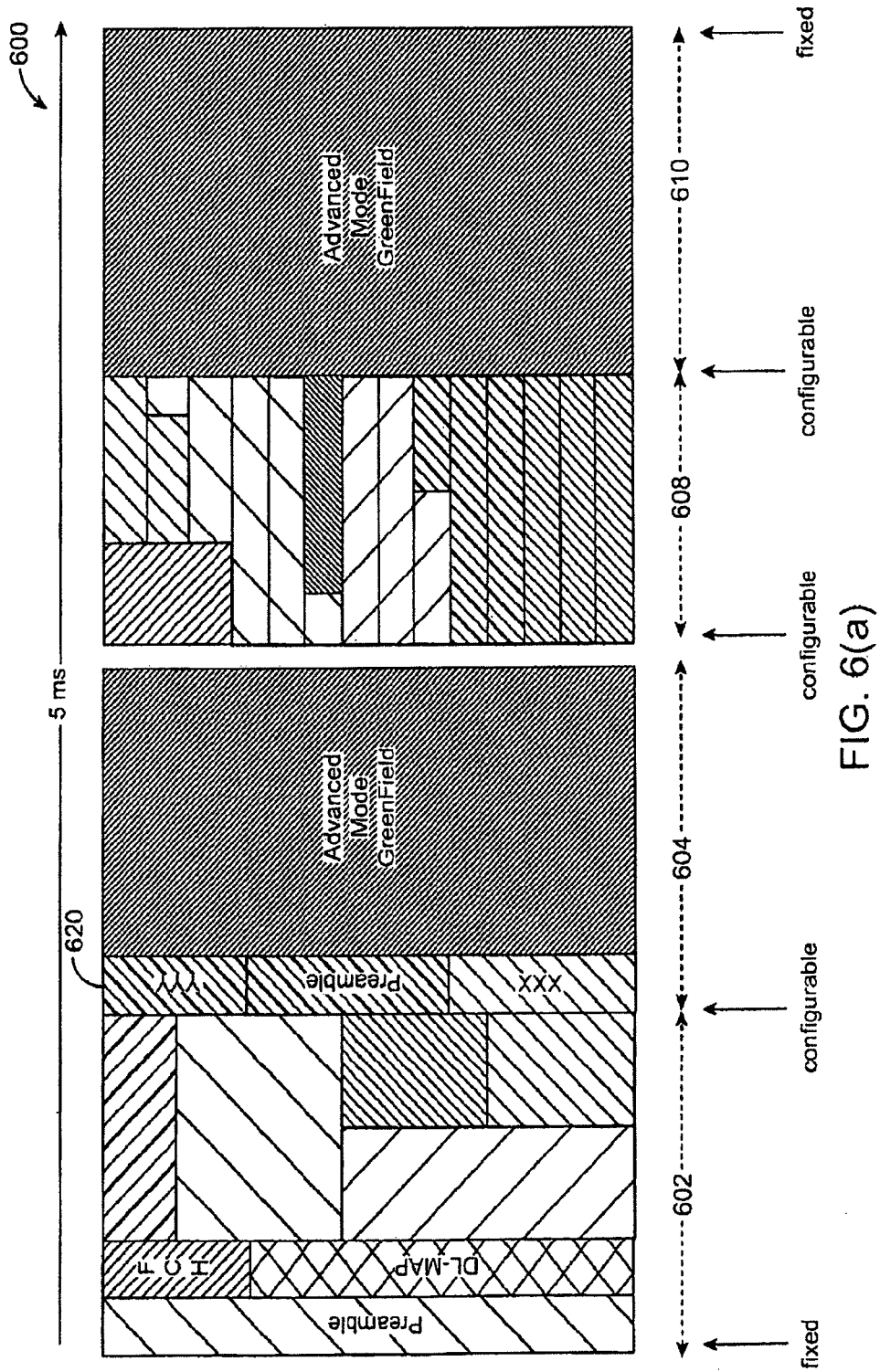
FIGS. 6a-d are simplified timing diagrams of embodiments of an advanced technology frame structure as seen from different device perspectives.

FIG. 6a illustrates an alternative advanced technology frame structure in which the advanced technology frame is decoupled from the legacy technology frame. The advanced technology enabled base station is able to support communications with client stations that are configured to receive either the legacy frames or the advanced technology frames or both. Since both the legacy and the advanced technology portions in the frames are multiplexed to the air link in a time division manner, the advanced technology enabled base stations can allocate or process data in resource allocations in each of the sub-subframes to support communications with all client stations.

The backward-compatible advanced technology mode frame structure 600 includes a legacy downlink subframe 602. However in contrast to operations such as shown in FIGS. 1-5, the advanced mode client stations need not monitor or any portion of the legacy downlink subframe 602, as clearly illustrated below in FIG. 6c. The frame structure 600 also includes two advanced mode fields 604 and 610. As shown earlier with respect to FIG. 3b, the fields 604 and 610 may include one or more advanced technology uplink or downlink sub-subframe (not shown.)

In the embodiment shown in FIG. 6a, the advanced mode field 604 includes a stand-alone advanced mode header 620. In this way, advanced mode operation may be independent of the legacy operation. As such, a custom header tailored for the needs of the advanced mode operation may be developed and legacy header usage can be eliminated when legacy operation is phased out.

Figure 6B:
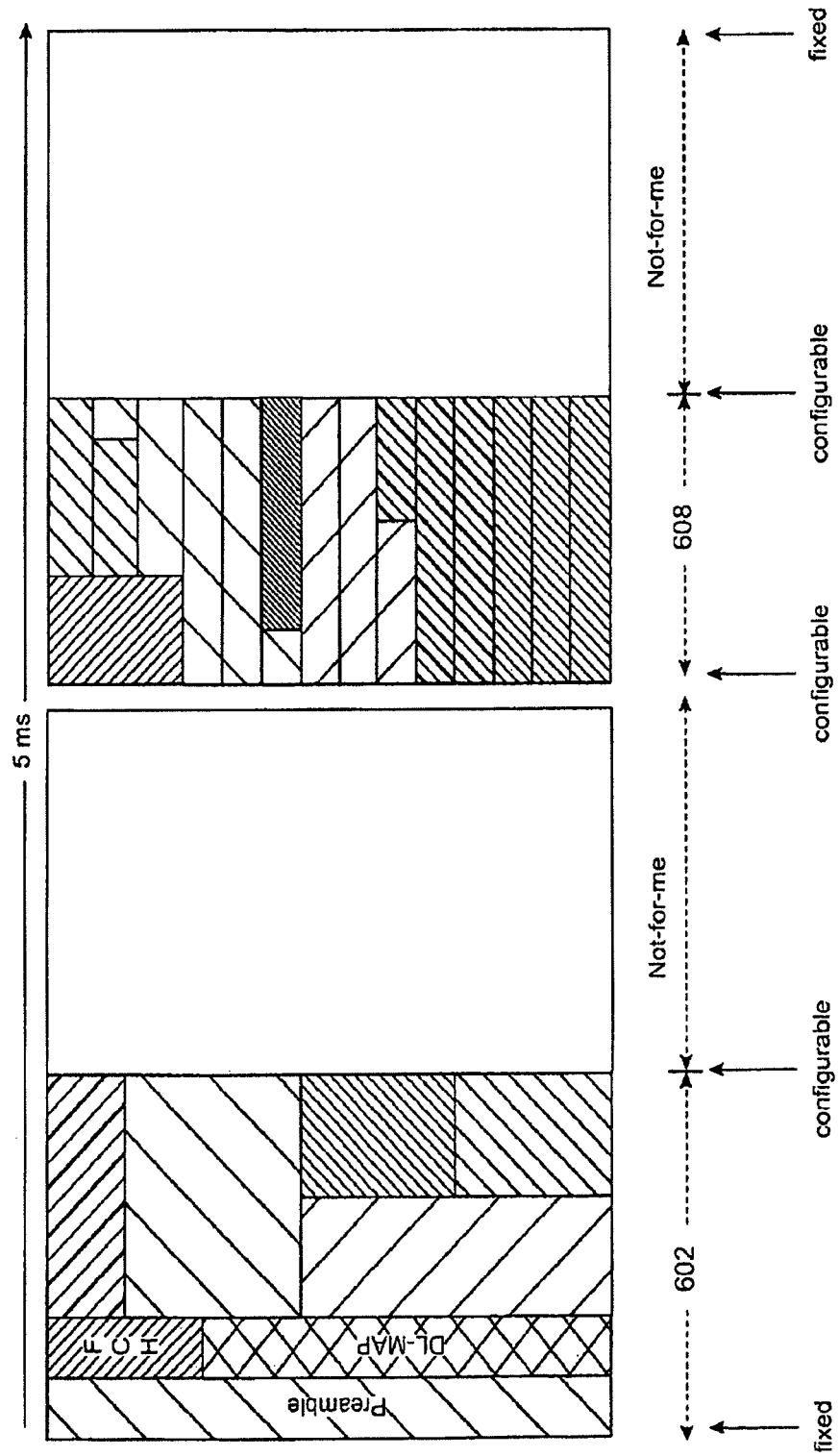

FIG. 6b illustrates a legacy client station perspective of an advanced technology frame structure embodiment, such as the embodiment illustrated in FIG. 6a. As illustrated in FIG. 6b, the legacy client station does not communicate over the advanced technology sub-subframes, and likely has no awareness of the advanced technology sub-subframes. From the perspective of the legacy client station, the advanced technology sub-subframes appear as regions within which the client station is not allocated any resources.

Figure 6C:
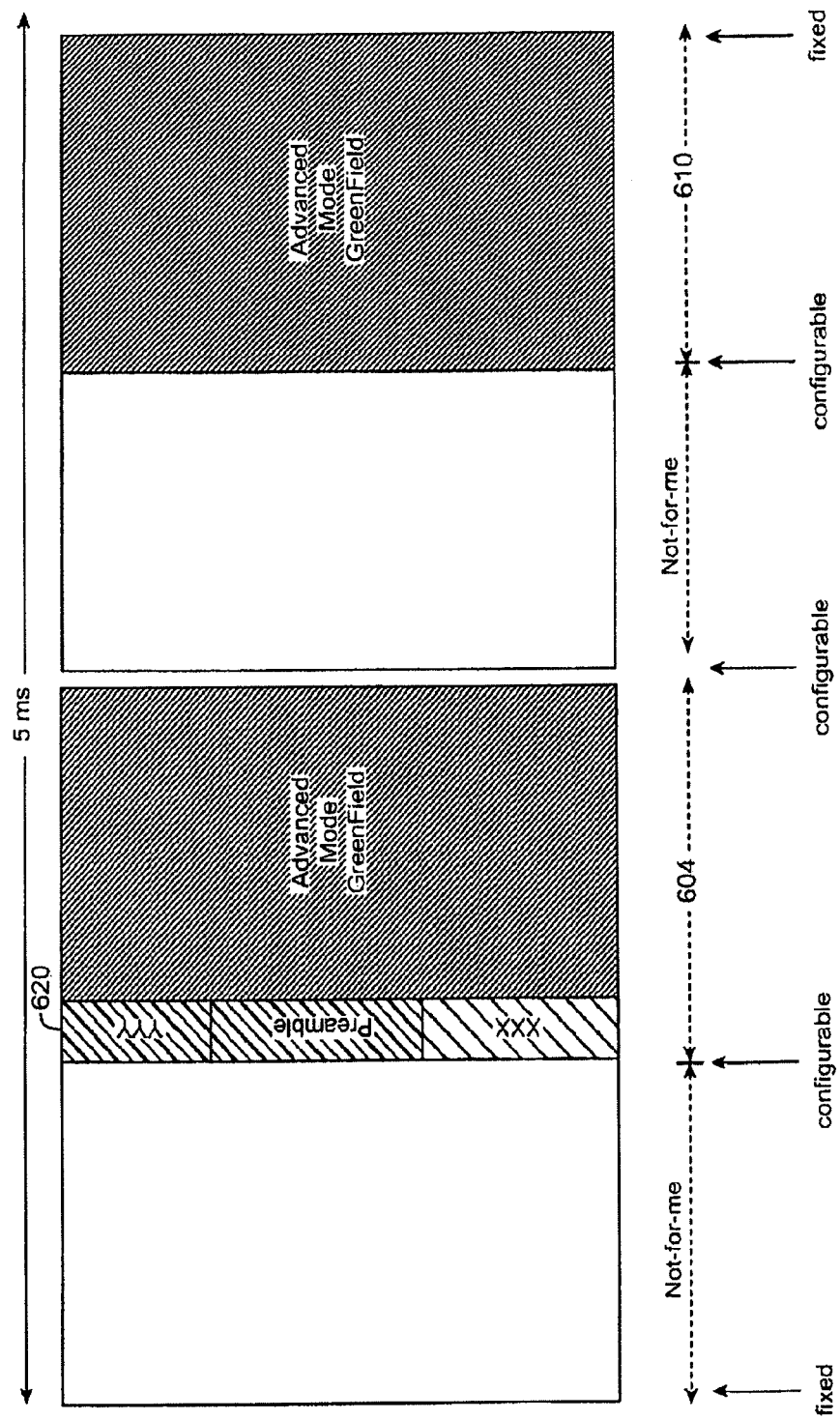

FIG. 6c illustrates an advanced technology enabled client station perspective of an advanced technology frame embodiment, such as the embodiment illustrated in FIG. 6a. As shown in FIG. 6c, the advanced technology enabled client station makes no communications over the legacy subframes, assuming that the advanced technology enabled client station does not support legacy communications. Such operation as possible because of the inclusion of the stand-alone advanced mode header 620. In contrast, according to the embodiment shown in FIGS. 1-5, the advanced mode client station monitors a portion of the subframe 602 in order to obtain certain information included in the legacy frame.

As described earlier, the time division multiplex operation does not need to allocate fixed amounts of time to support either the legacy communications or advanced technology communications. Thus, the amount of resources dedicated to supporting each type of communication may dynamically vary based on the load placed on each type of communications.

There may be few advanced technology enabled client stations at the initial rollout of the advanced technology system, and thus minimal resources and sub-subframe duration may be allocated to supporting the advanced technology communications. Over time, more advanced technology enabled client stations will begin to use the system. At some point in time, virtually no legacy client stations will exist, and the frame structure supports the ability to allocate minimal resources and sub-subframe duration to supporting the legacy communication.

Figure 6D:
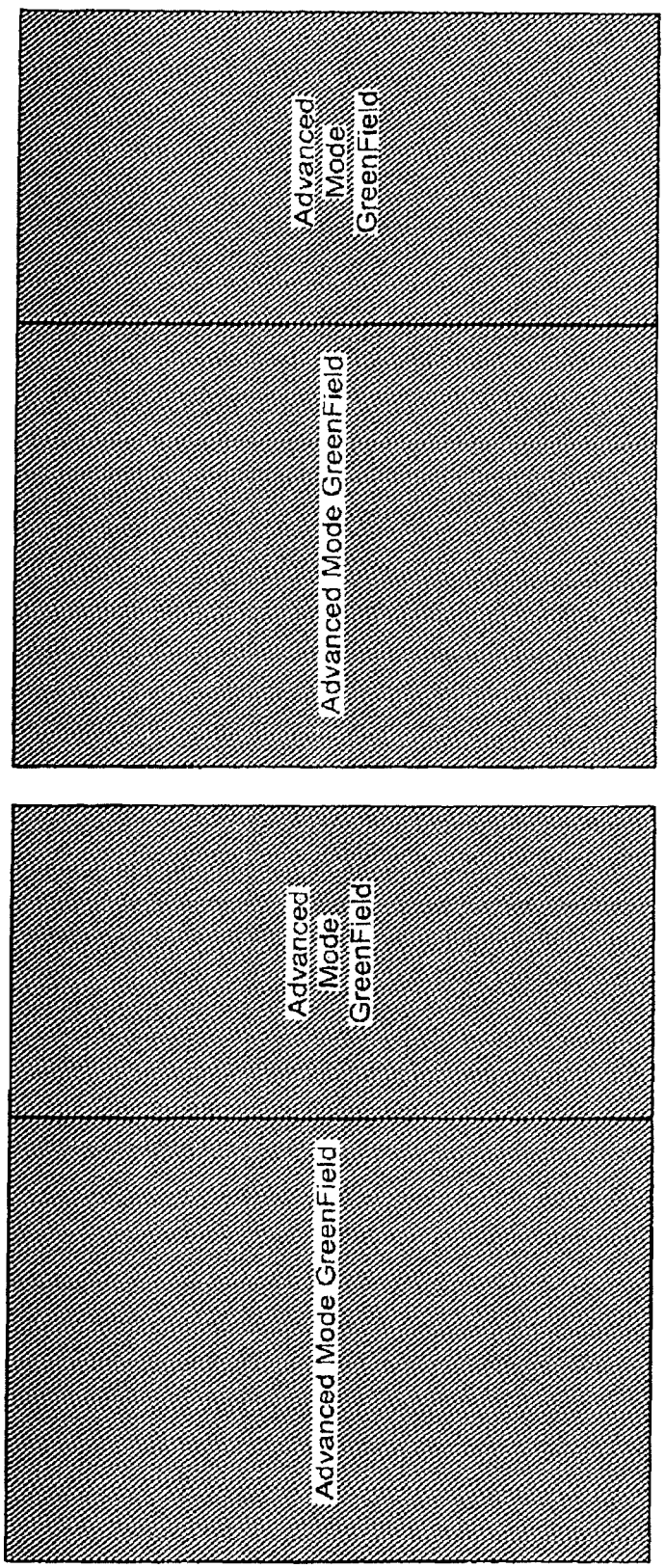

FIG. 6d illustrates the advanced technology frame at a time in which support for legacy communications has substantially been eliminated. The entire downlink and uplink subframes may be dedicated to supporting advanced technology communications. In contrast, in the embodiments shown in FIGS. 2 and 3b, some elements of the legacy subframe continue to be used in advanced mode operation even after all legacy devices have been phased out of the system.

In some systems, when the advanced technology system is first deployed and the ratio of legacy to advanced mode usage is quite high, it is efficient for advanced mode operation to use certain overhead information carried in the legacy mode subsubframe. By using overhead information carried in the legacy mode sub-subframe, the advanced mode sub-subframe need not carry such information and can be more fully dedicated to carrying advanced mode data.

However, sometimes the legacy frame overhead is not optimal for use in advanced mode operation. For example, it may be advantageous to use an improved preamble or a new map format for advanced operation. To the extent that the advanced mode operation relies on elements of the legacy sub-subframe, the ability to incorporate differences between legacy and advanced mode operation is limited. Thus, in some implementations, the embodiments shown in FIGS. 1-5 are advantageous at initial deployment while the embodiment shown in FIG. 6 may have long-term advantages. As such, a system may be designed which transforms over time from an implementation consistent with FIGS. 1-5 to an implementation consistent with FIG. 6.

Figure 7B:
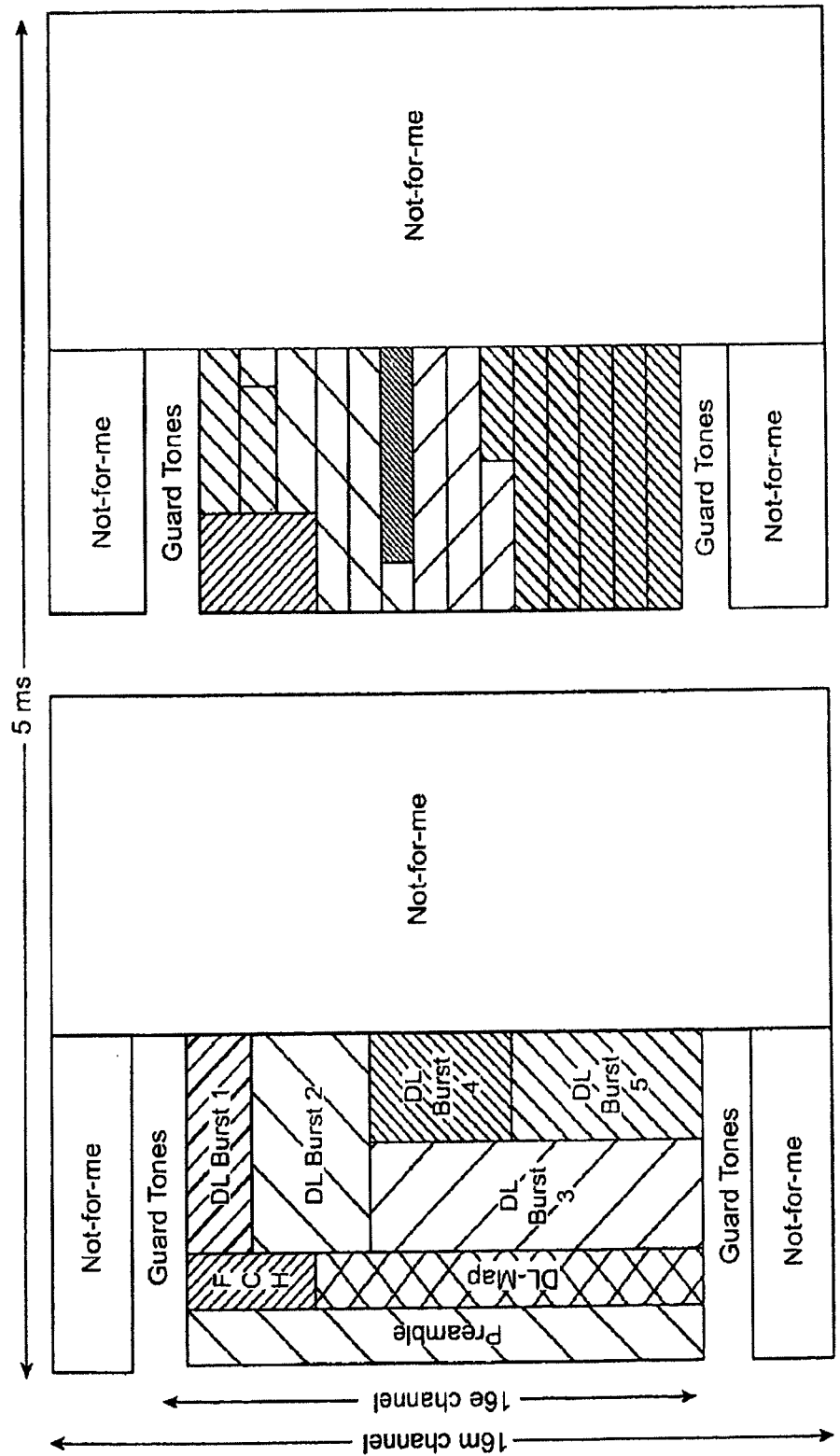
Figure 7C:
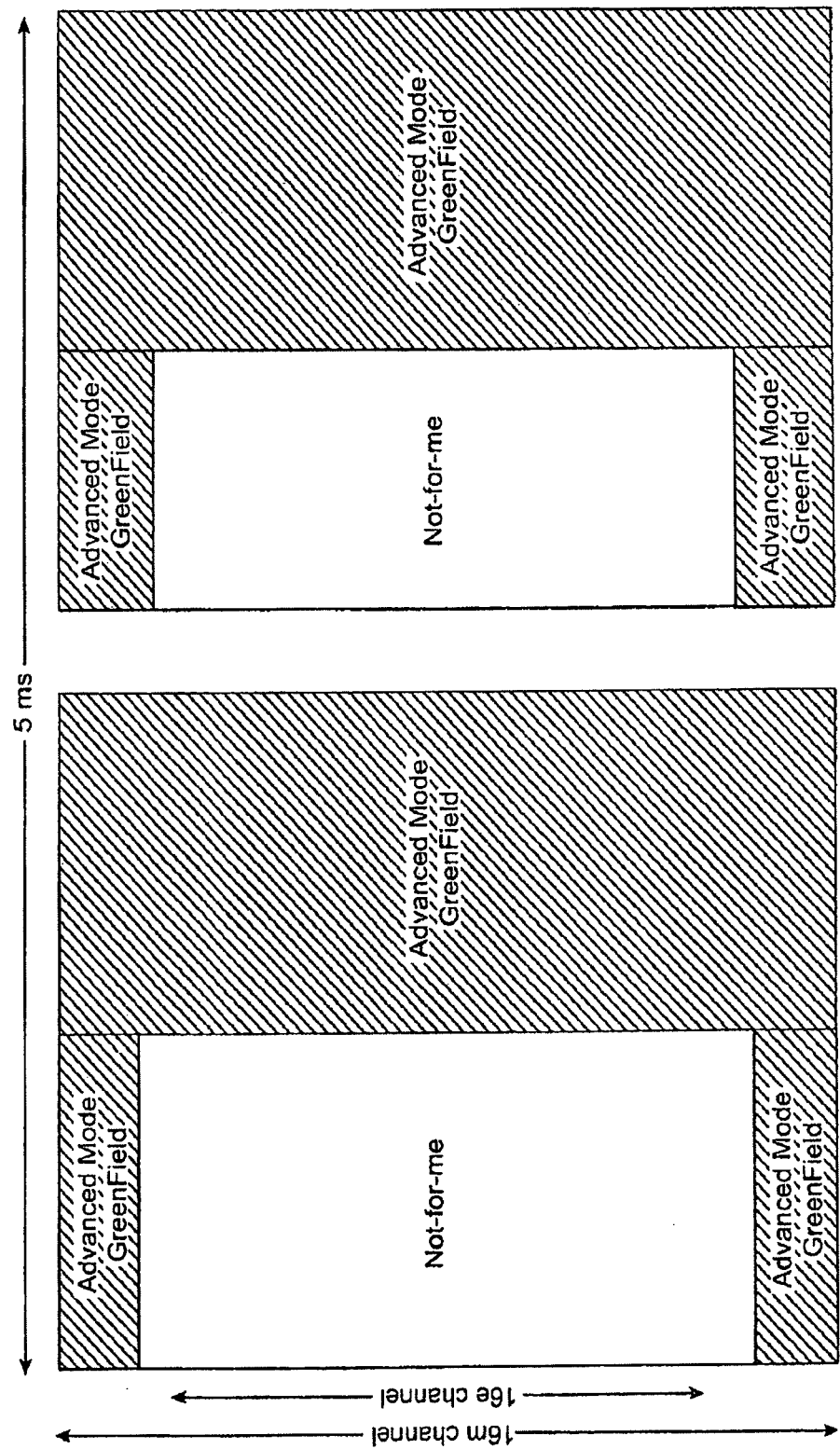

FIGS. 7a-c are simplified timing diagrams of embodiments of an advanced technology frame structure with legacy compatibility operating in a further expanded frequency dimension. As previously illustrated, the advanced technology frame structures can be implemented by a system that operates and occupies the same bandwidth as a legacy communication system. However, the frame structure is not limited to maintaining the same frequency bandwidth in the advanced technology system, as will be described below.

FIG. 7a illustrates, from the perspective of an advanced technology enabled base station, an advanced technology frame structure that supports legacy communications with additional operating bandwidth as compared with the legacy system. The advanced technology frame structure maintains the time division multiplexing of the legacy sub-subframes and the advanced technology sub-subframes. However, the advanced technology frame also supports communications in expanded frequency dimensions, incorporating a frequency division multiplexing component. The following examples illustrate frequency expansion both above and below the frequency bands allocated to the legacy communication system, but the advanced technology frame structure can readily be applied to one sided frequency expansion as well.

As shown in the timing diagram of FIG. 7a, each of the subframe portions has a frequency portion supporting advanced technology communications. The additional frequency portion can be, for example, additional subcarriers of an OFDMA symbol. There can be one or more predetermined guard bands isolating the legacy frequency bands from the appended frequency portions, but these guard bands may be eliminated or otherwise omitted in those subframe portions that support advanced technology communications.

As shown in FIG. 7a, an advanced technology enabled base station can configure both the advanced technology portions and the legacy portions of the frame structure. Although the advanced technology portions not appended to a legacy subsubframe may be configured to carry either downlink or uplink communications, those advanced technology frequency bands that are appended to the legacy sub-subframes typically are configured to support the same communication direction as supported by the associated legacy sub-subframe. For example, the advanced technology frequency bands appended to the downlink sub-subframe will be configured for downlink communications, while the advanced technology frequency bands appended to the uplink sub-subframe will be configured for uplink communications.

FIG. 7b illustrates the wide band advanced technology frame structure from the perspective of a legacy client station. The legacy device has no awareness of the advanced technology regions or is not allocated resources within any of the advanced technology sub-subframes or frequency regions from the perspective of the legacy device the advanced technology.

FIG. 7c illustrates the wide band advanced technology frame structure from the perspective of a wideband advanced technology enabled client station. In the embodiment of FIG. 7c, the advanced technology client station is assumed to not support legacy communications.

From the perspective of the wideband advanced technology enabled client station, the frame structure supports advanced technology communications, with minor limitations on uplink and downlink transmissions in the sub-subframe portions that overlap the legacy sub-subframes. These limitations diminish as the resources allocated to legacy devices shrinks.

Figure 8:
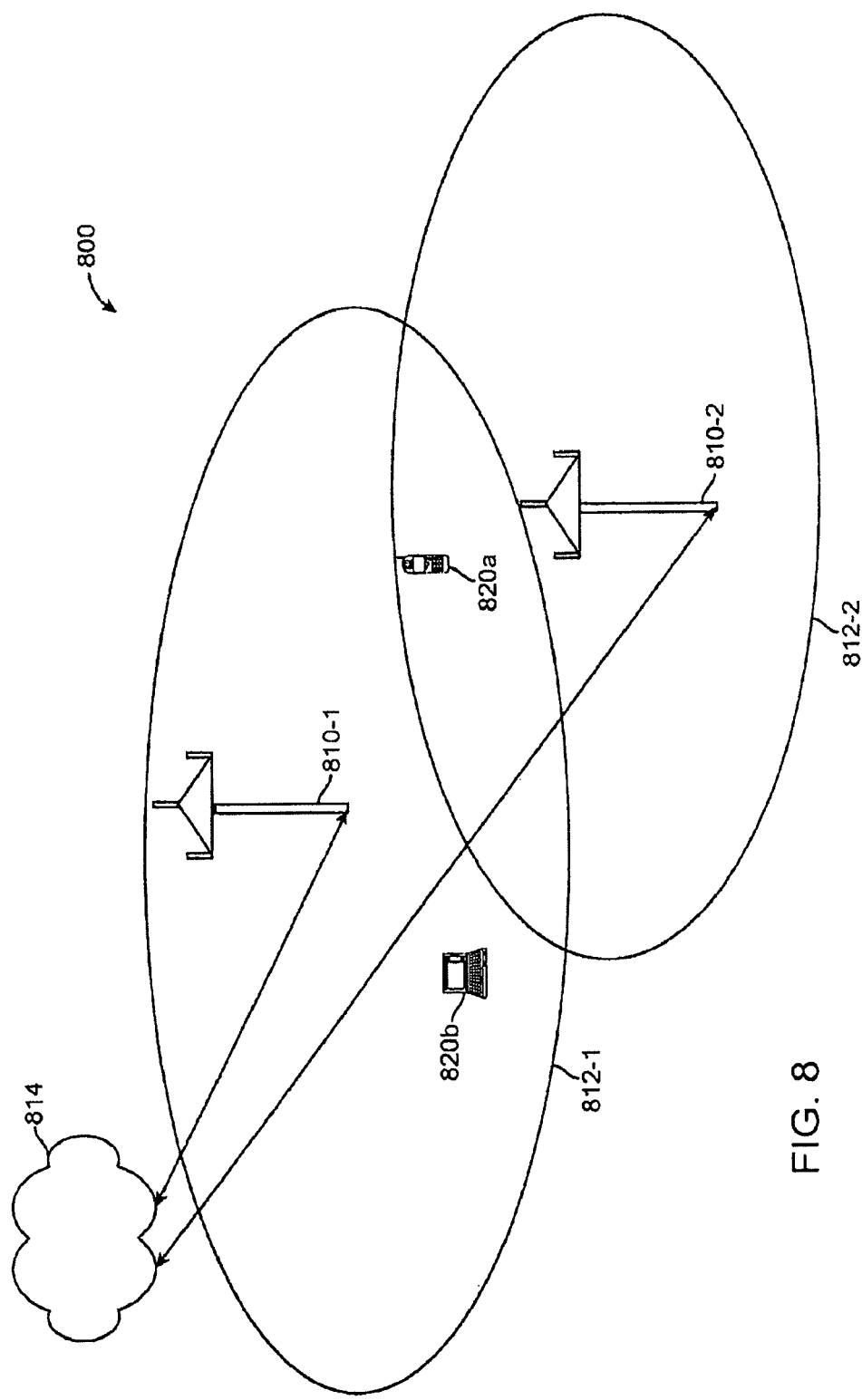
FIG. 8 is a simplified functional block diagram of a system implementing an advanced technology frame structure.

FIG. 8 is a simplified functional block diagram of a system 800 implementing an advanced technology frame structure. The wireless communication system 800 includes a plurality of base stations, 810-1 and 810-2, coupled to a network 814, such as a wide area network. Each base station, e.g. 810-1, services devices within its respective coverage area, e.g., 812-1, sometimes referred to as a cell.

A first base station 810-1 serves a first coverage area 812-1 and a second base station 810-2 serves a corresponding second coverage area 812-2. The base stations 810-1 and 810-2 are depicted as adjacent or otherwise neighboring base stations for the purposes of discussion. In one embodiment, the base station 810-1 comprises two base station transmitters configured to transmit on different frequency channels/bandwidths.

As an example, the base stations 810-1 and 810-2 serve those devices within the respective coverage areas 812-1 and 812-2. As shown in FIG. 8, first and second client stations or client stations 820a and 820b are within the first coverage area 812-1 and can be supported by the first base station 810-1.

For the purposes of discussion, the first base station 810-1 can support advanced technology communications as well as legacy communications. The second base station 810-2 can be limited to supporting legacy communications. Similarly, assume for the purposes of discussion that the first client station 820a is advanced technology enabled, while the second client station 820b is a legacy device, incapable of advanced technology communication.

The first base station 810-1 can support communications with both the first and second subscribe stations 820a and 820b by implementing an advanced technology frame structure such as one illustrated in FIGS. 1-7. The first base station 810-1 can allocate legacy resources to the second client station 820b in the legacy sub-subframes and can allocate advanced technology resources to the first client station 820a in the advanced technology sub-subframes. As discussed earlier, the advanced technology sub-subframes are time division multiplexed with the legacy sub-subframes in the duration of a legacy subframe portion.

The advanced technology frame timing implemented by the first base station 810-1 can be synchronized to the frame timing of the legacy second base station 810-2, such as exemplified in FIG. 4, to minimize the collisions that may occur if the advanced uplink sub-subframes occur during the legacy downlink subframes, or if advanced downlink sub-subframes occur during the legacy uplink subframes.

Figure 9:
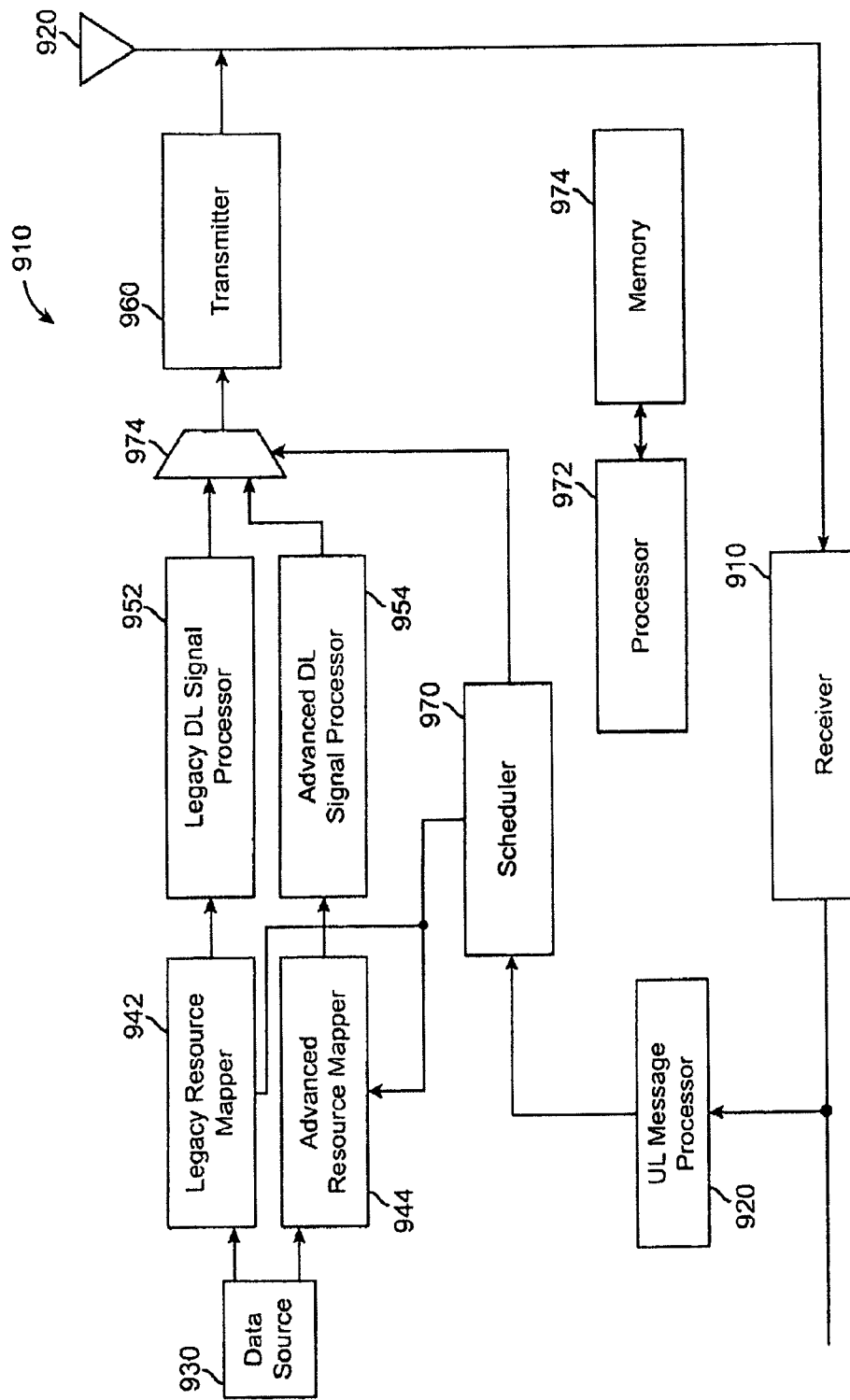
FIG. 9 is a simplified functional block diagram of an embodiment of a base station implementing an advanced technology frame structure.

FIG. 9 is a simplified functional block diagram of an embodiment of a base station 810 implementing an advanced technology frame structure. The base station 810 includes both transmission and reception capabilities and is some times referred to as a base station transmitter/receiver.

The base station 810 can be, for example, the first base station 810-1 shown in the wireless communication system of FIG. 8. The base station 810 includes the capabilities to configure and support one or more advanced technology sub-subframes in each legacy subframe. The base station 810 functionality is simplified to include those portions that operate as part of advanced technology support. Other portions of the base station 810 are omitted for the purposes of brevity and clarity.

The base station 810 includes an antenna 902 coupled to an output of a transmitter 960 as well as to an input of a receiver 910. The output of the receiver 910 can be coupled to an input of a Uplink Message Processor 920 that can be configured, for example, to process uplink resource allocation requests from legacy and advanced technology client stations. The uplink message processor 920 can inform a scheduler 970 of the requests.

The scheduler 970 can be configured to determine the resources to allocate to legacy communications as well as advanced technology communications. The scheduler 970 can be configured to control the duration of the time division multiplexing of the legacy subframes as well as any frequency multiplexing employed. In one embodiment, these values are dynamically varied, and each base station can be configured to independently determine them. In another embodiment, the scheduler 970 determines the resources to allocate based on one or more settings received from a system controller (not shown, but which may be an element of the network 814.) These settings may influence the time division multiplex timing as well as any frequency multiplexing.

The scheduler 970 can be configured to control a multiplexer 974 that is configured to time division multiplex a subframe portion of a legacy communication system into a legacy sub-subframe and an advanced technology sub-subframe based on a control from the scheduler 970.

The scheduler 970 can also control a legacy resource mapper 942 as well as an advanced resource mapper 944. Each of the legacy resource mapper 942 and advanced resource mapper 944 can be configured to selectively receive data from a data source 930 and map it to an appropriate sub-subframe. The scheduler 970 can control or otherwise enable the selection of the data by the active resource mapper.

The legacy resource mapper 942 is configured to allocate legacy communications to the legacy sub-subframe and the advanced technology resource mapper 944 is configured to allocate advanced technology communications to the advanced technology sub-subframe.

The output of the legacy resource mapper 942 is coupled to a legacy downlink signal processor 952 that configures the legacy downlink sub-subframe using the data mapped by the legacy resource mapper 942. Similarly, the output of the advanced resource mapper 944 is coupled to an advanced downlink signal processor 954 that configures the advanced technology downlink sub-subframe using the data mapped by the advance resource mapper 944.

The outputs of the legacy downlink signal processor 952 and advanced downlink signal processor 954 are each coupled to respective inputs of the multiplexer 974. The active multiplexer path, as determined by the scheduler 970, is coupled to the transmitter 960 for downlink transmission over antenna 902.

Typically, the various elements shown in FIG. 9 are controlled by a processor 972 which is capable of directing the functioning of one or more of the elements shown in FIG. 9. (Connections Between the Various Elements are not Shown so as not to Complicate the Diagram.) Typically the operation of the processor 972 is accomplished with reference to one or more storage media, such as a memory 974. The functionality of all or portions of one or more of the elements shown can be implemented as one or more computer readable instructions encoded on one or more storage media.

Figure 10:
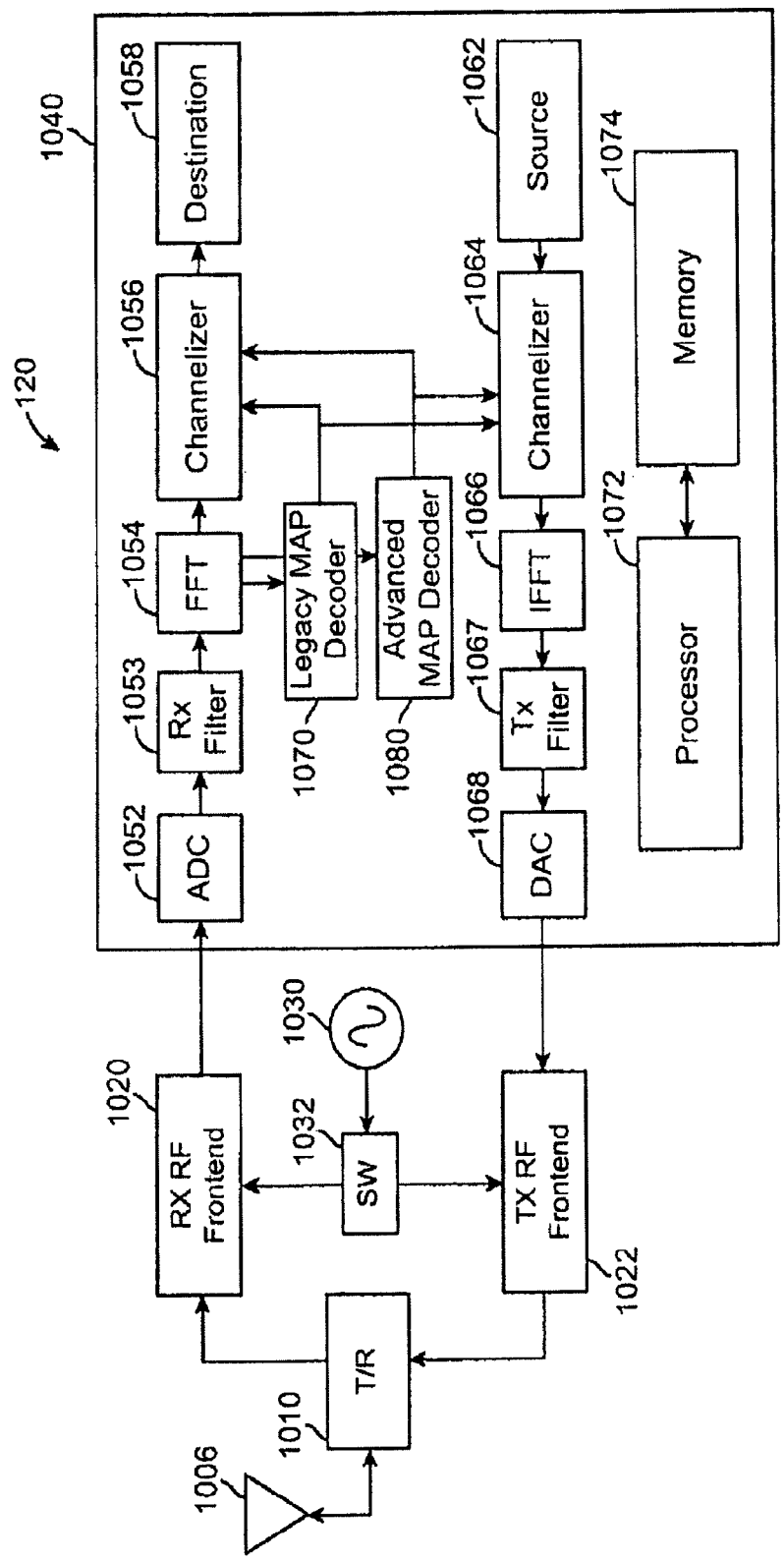
FIG. 10 is a simplified functional block diagram of an embodiment of a client station supporting advanced technology frame structure.

FIG. 10 is a simplified functional block diagram of an embodiment of a client station 820 supporting-advanced technology frame structure. The client station 820 can be, for example, an advanced technology enabled client station, e.g., 820a, in the wireless communication system of FIG. 8.

The client station 820 includes a receiver configured to receive a time division multiplexed subframe portion of a legacy communication system having a legacy sub-subframe and an advanced technology sub-subframe.

The client station 820 includes an antenna 1006 through which the uplink and downlink signals are communicated. The antenna 1006 couples the downlink signals to a transmit/receive (T/R) switch 1010. The T/R switch 1010 operates to couple the downlink signals to the receiver of the client station 820 during a downlink subframe and operates to couple uplink signals from the transmitter portion of the client station 120 during an uplink subframe.

During the downlink portion or subframe, the T/R switch 1010 couples the downlink signals to a receive RF front end 1020. The receive RF front end 1020 can be configured, for example, to amplify, frequency convert a desired baseband frequency, and filter the signal. The baseband signal is coupled to a receive input of a baseband processor 1040.

The receive input of the baseband processor 1040 couples the received baseband signal to an Analog to Digital Converter (ADC) 1052 that converts the analog signal to a digital representation. The output of the ADC 1052 is typically filtered, such as by filter 1053, the output of which can be coupled to a transformation module, such as Fast Fourier Transform (FFT) engine 1054 that operates to convert the received time domain samples of an OFDM symbol to a corresponding frequency domain representation. The sample period and integration time of the FFT engine 1054 can be configured, for example, based upon the downlink frequency bandwidth, symbol rate, subcarrier spacing, as well as the number of subcarriers distributed across the downlink band, or some other parameter or combination of parameters.

The output of the FFT engine 1054 can be coupled to a channelizer 1056 that can be configured to extract the subcarriers from those symbols that are allocated to the particular client station 120. The channelizer 1056 can be configured, for example, to extract the portion of the legacy or advanced downlink sub-subframes relevant to the client station 120. The output of the channelizer 1056 can be coupled to a destination module 1058. The destination module 1058 represents an internal destination or output port to which received data may be routed.

The client station 120 also includes a legacy map decoder 1070 configured to access a resource map from the legacy sub-subframe and determine a resource allocation for legacy technology map and an advanced technology map decoder 1080 configured to access the advanced technology map and determine an advanced technology resource allocation in the advanced technology sub-subframe. The legacy map decoder 1070 and the advanced technology map decoder 1080 can be coupled to the channelizer 1056 to control the extraction of the data in the allocated downlink resources. Similarly, the legacy map decoder 1070 and the advanced technology map decoder 1080 can be coupled to the uplink channelizer 1064 to control the allocation of uplink data to the appropriate allocated uplink resources.

The uplink path is complementary to the downlink signal path. A source module 1062 of the base band processor 1040, which may represent an internal data source or an input port, generates or otherwise couples uplink data to the baseband processor 1040. The source 1062 couples the uplink data to an uplink channelizer 1064 that operates to couple the uplink data to appropriate uplink resources that are allocated to support the uplink transmission.

The output of the uplink channelizer 1064 is coupled to an FFT engine 1066 that operates to transform the received frequency domain subcarriers to a corresponding time domain OFDM symbol. The uplink FFT engine 1066 may support the same bandwidth and number of subcarriers as supported by the downlink FFT engine 1054.

The output of the uplink FFT engine 1066 is coupled to a Digital to Analog Converter (DAC) 1068 that converts the digital signal to an analog representation. The analog baseband signal is coupled to a transmit front end 1022, where the signal is frequency translated to the desired frequency in the uplink band. The output of the transmit front end 1022 is coupled to the T/R switch 1010 that operates to couple the uplink signal to the antenna 1006 during the uplink subframe.

A local oscillator (LO) 1030 is coupled to a switch 1032 or demultiplexer that selectively couples the LO 1030 to one of the receive front end 1022 or transmit front end 1022 so as to be synchronized to the state of the T/R switch 1010.

Typically, the various elements shown in FIG. 10 are controlled by a processor 1072 that is capable of directing the functioning of one or more of the elements shown in FIG. 10. (Connections between the various elements are not shown so as not to complicate the diagram.) Typically the operation of the processor 1072 is accomplished with reference to one or more storage media, such as a memory 1074. The functionality of all or portions of one or more of the elements can be implemented as one or more computer readable instructions encoded on one or more storage media.

Figure 11:
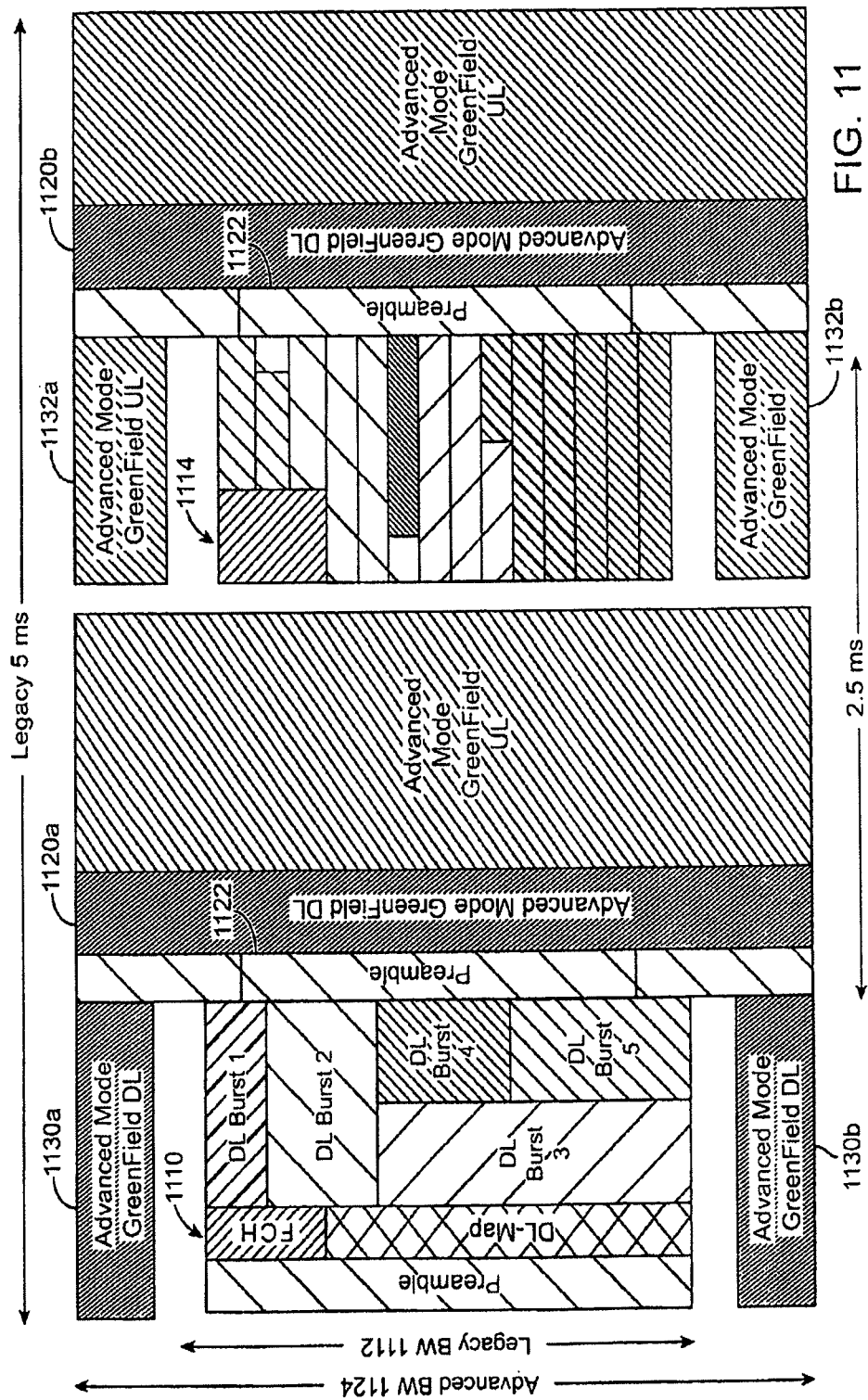
FIG. 11 is a flow chart illustrating an advanced technology frame structure incorporating several features.

FIG. 11 illustrates an advanced technology frame structure 1100 incorporating several aspects discussed above. In particular, the frame structure 1100 includes a legacy downlink sub-subframes 1110 that spans a legacy frequency bandwidth 1112. The frame structure 1100 also includes two advanced mode downlink sub-subframes 1120a in 1120b which occur at a fixed offset from one another. For example, in FIG. 11, the sub-subframes 1120 occur at 2.5 ms intervals. The advanced mode downlink sub-subframes also include stand-alone headers 1122 which obviate the need for advanced mode client stations to monitor a portion of the legacy subframes. In addition, the frame 1100 includes two advanced mode downlink sub-subframe portions 1130a 1130b, which occur at the same time as the legacy downlink sub-subframe 1110 and use a portion of the advanced mode frequency bandwidth 1124. Likewise the frame 1100 includes two advanced mode uplinks sub-subframe portions 1132a and 1132b which occur at the same time as the legacy uplink subframe 1114 and use a portion of the advanced mode frequency bandwidth 1124.

Figure 12:
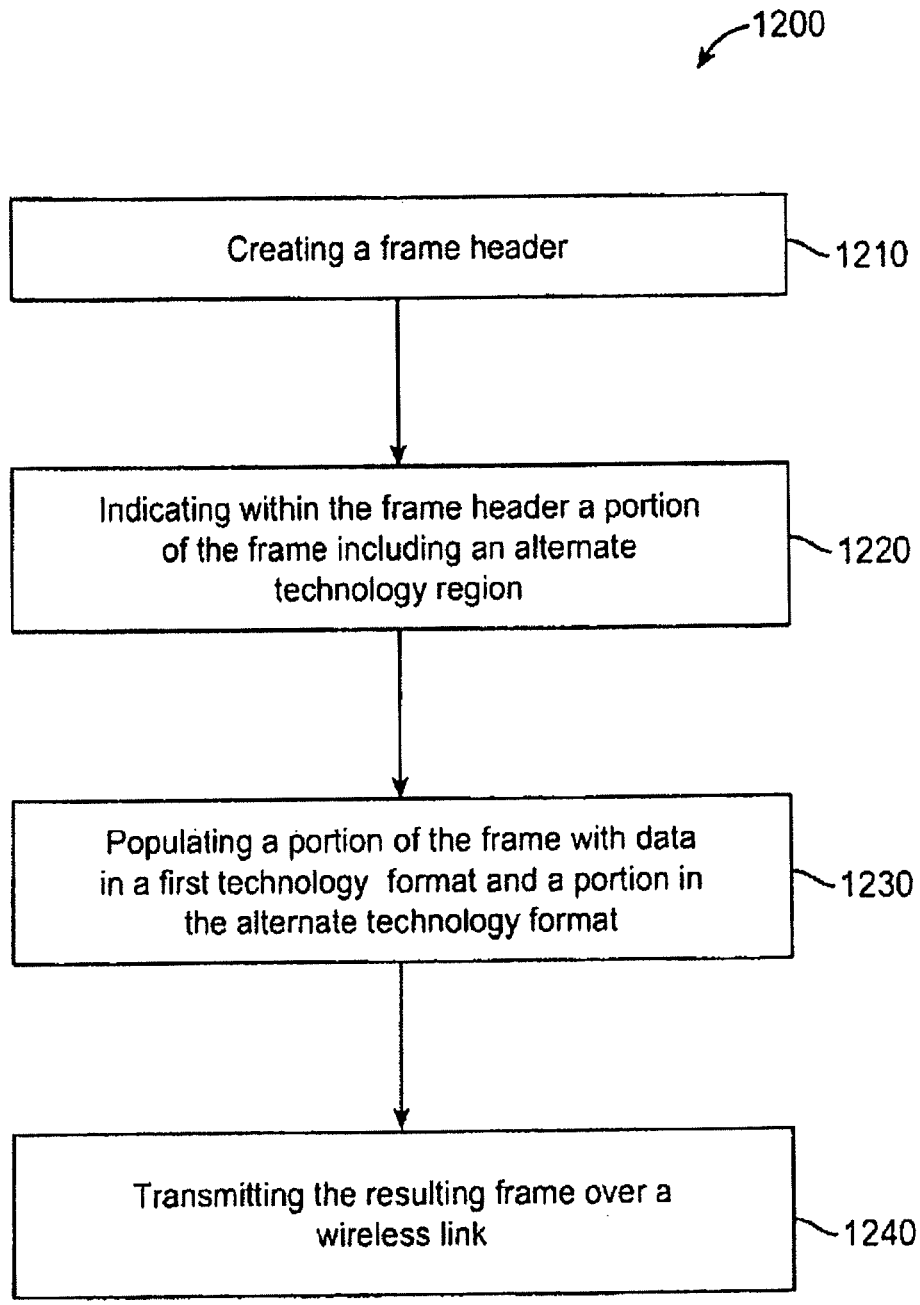
FIG. 12 is a flow chart illustrating a process for creating an integrated, backwards compatible advanced technology frame structure.

FIG. 12 illustrates a process 1200 for creating an integrated, backwards compatible advanced technology frame structure. In block 1210, a frame header is created, such as the frame header 206 of FIG. 2, which includes the advanced mode allocations, or the header 120 of FIG. 1b, which includes a pointer to the advanced technology resource map 124 within the advanced mode sub-subframe 118. In block 1230, a corresponding frame is created. A portion of the frame is populated with data using a first technology format, such as, for example, the legacy format described herein, and a portion is populated with data using a second technology form, such as, for example, the advanced mode format described herein. In block 1240, the resulting frame is transmitted over a wireless network. In one embodiment, blocks 1210, 1220 and 1230 are performed by the legacy resource mapper 942, the advanced resource mapper 944, the legacy DL signal processor 952, the advanced DL signal processor 954, and the scheduler 970. In one embodiment, block 1240 is performed by the transmitter 960 and the antenna 902.

Figure 13:
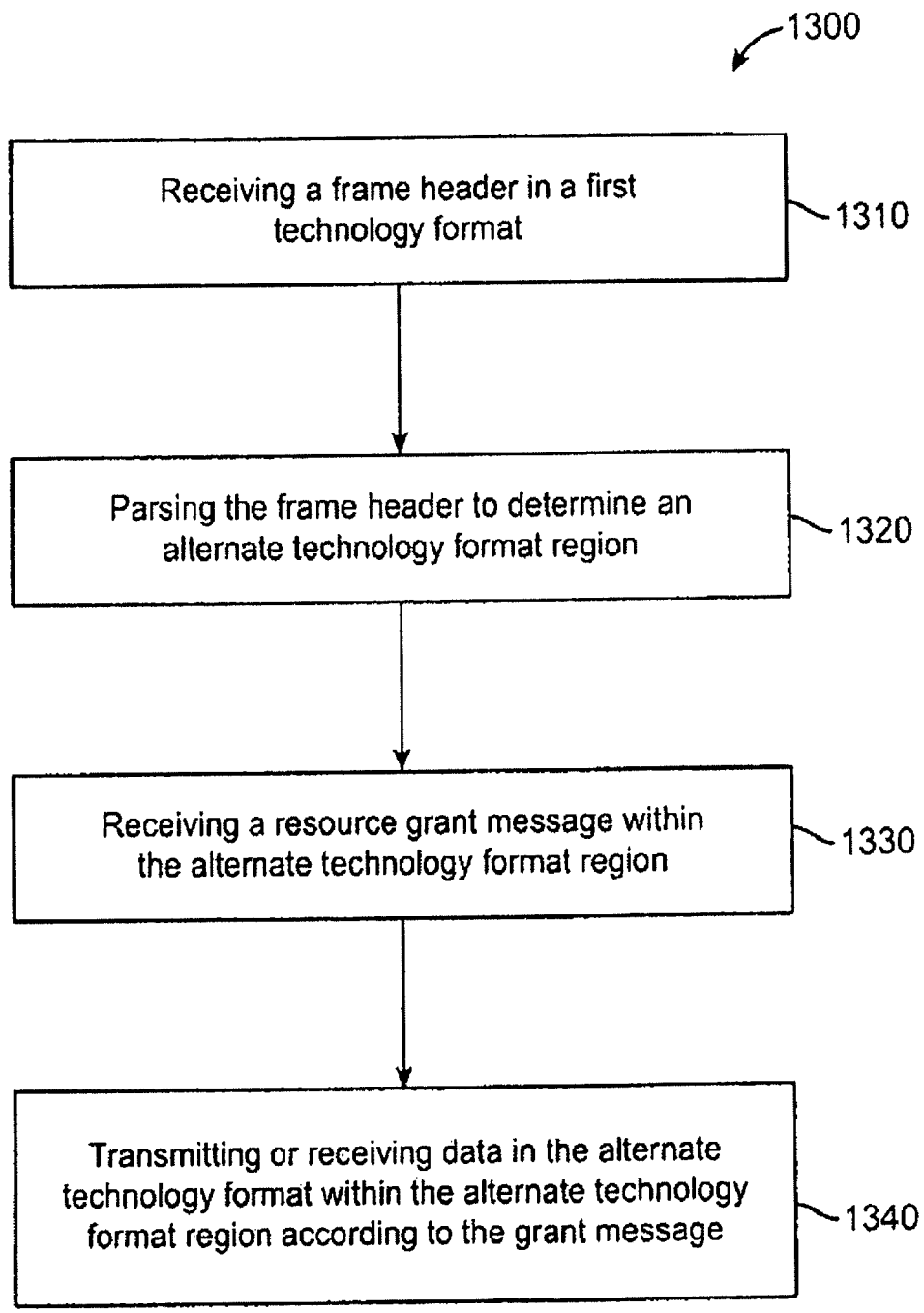
FIG. 13 is a flow chart illustrating a process for receiving an integrated, backwards compatible advanced frame structure at a client station.

FIG. 13 illustrates a process 1300 for receiving an integrated, backwards compatible advanced frame structure at a client station. In block 1310, a frame header in a first technology format is received. In block 1320, the frame header is parsed to determine the location of an alternate technology region. In block 1330, a grant of resources within the alternate technology region is granted according to a grant message received within the alternate technology format region. In block 1340, data is transmitted or received in the alternate technology format within the alternate technology region according to the grant. The process 1300 illustrates operation at the client station in a system using a frame structure such as the one shown in FIG. 1b where in the advanced technology resource map 124 is included within the advanced mode region. A similar process can be used to receive a frame according to the format shown in FIG. 2. For example, the client station receives a resource grant message within the first technology format region granting allocations within the alternate technology region. The process shown in FIG. 13 may be implemented, for example, by the client station of FIG. 10.

Figure 14:
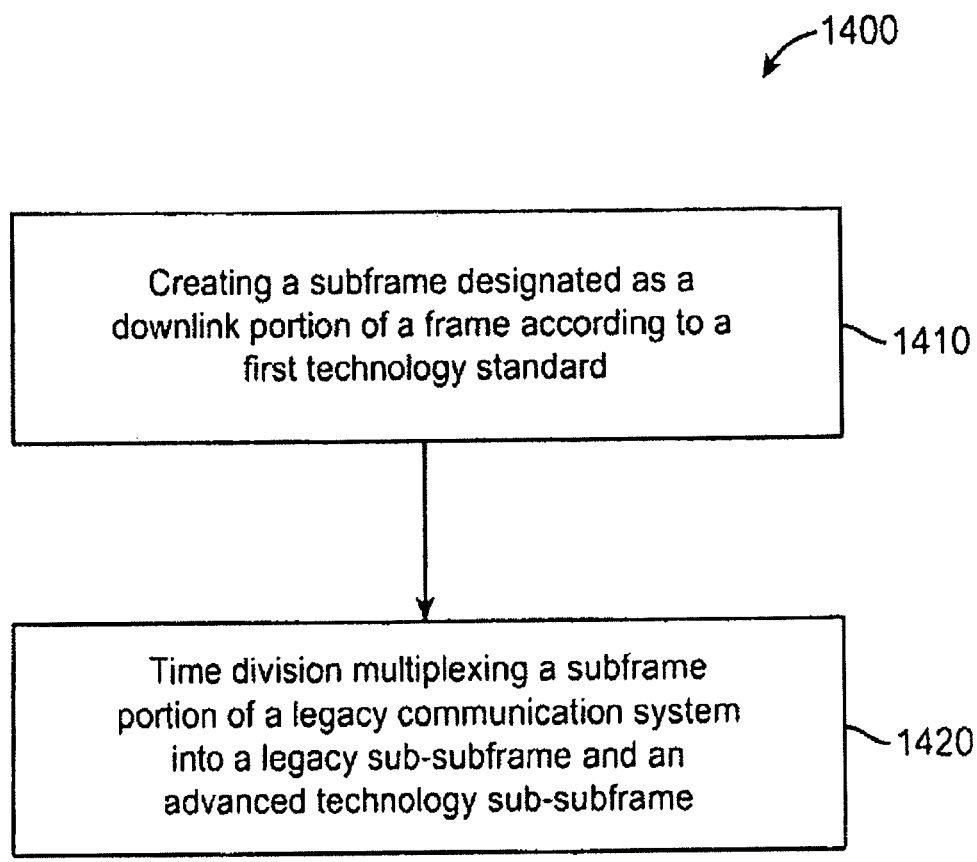
FIG. 14 is a flow chart illustrating a process for creating an integrated, backwards compatible advanced frame structure for transmission over a wireless link.

FIG. 14 illustrates a process 1400 for creating an integrated, backwards compatible advanced frame structure for transmission over a wireless link. In block 1410, a base station, such as the one shown in FIG. 9, creates a subframe designated, according to a first technology standard, as a downlink portion of a frame. For example the first technology standard may be IEEE 802.16e. In block 1420, a base station time division multiplexes the downlink subframe portion into a sub-subframe compliant with the standard and an advanced technology sub-subframe. For example, an uplink, advanced mode sub-subframe is inserted into the downlink subframe. The alternate technology may be an IEEE 802.16m type or LTE type technology. Among other structures, the resulting structure may resemble the frame structure 1100 shown in FIG. 11 and may be implemented by, for example, a base station implemented in accordance with FIG. 9. In another example, an advanced mode downlink sub-subframe is inserted into a standard-compliant uplink subframe.

Figure 15:
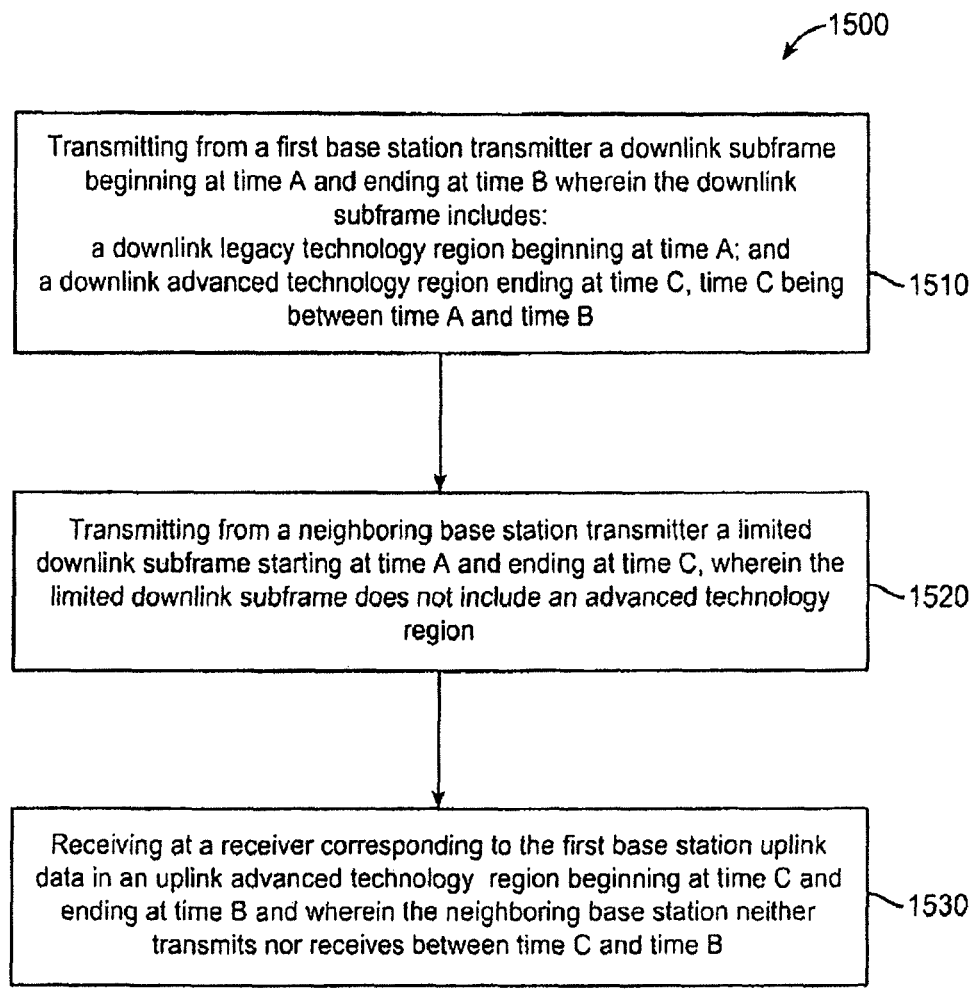
FIG. 15 is a flow chart illustrating a process for using a system that includes both advanced mode enabled base station transmitters and legacy only base station transmitters.

FIG. 15 illustrates a process 1500 for using a system that includes both advanced mode enabled base station transmitters and legacy only base station transmitters. In block 1510, a first base station transmitter transmits a downlink subframe beginning at time A and ending at time B. The downlink subframe includes a downlink legacy technology region beginning at time B and a downlink advanced technology region ending a time C. Time C is between time A and time B. In block 1520, a neighboring base station transmitter transmits a limited downlink subframe starting at time A and ending at or before time C. The limited downlink subframe does not include any advanced mode regions. In block 1530, a receiver corresponding to the first base station transmitter receives uplink data in an advanced technology region beginning at time C and ending at time B. The neighboring base station neither transmits nor receives between time C and B.

Figure 16:
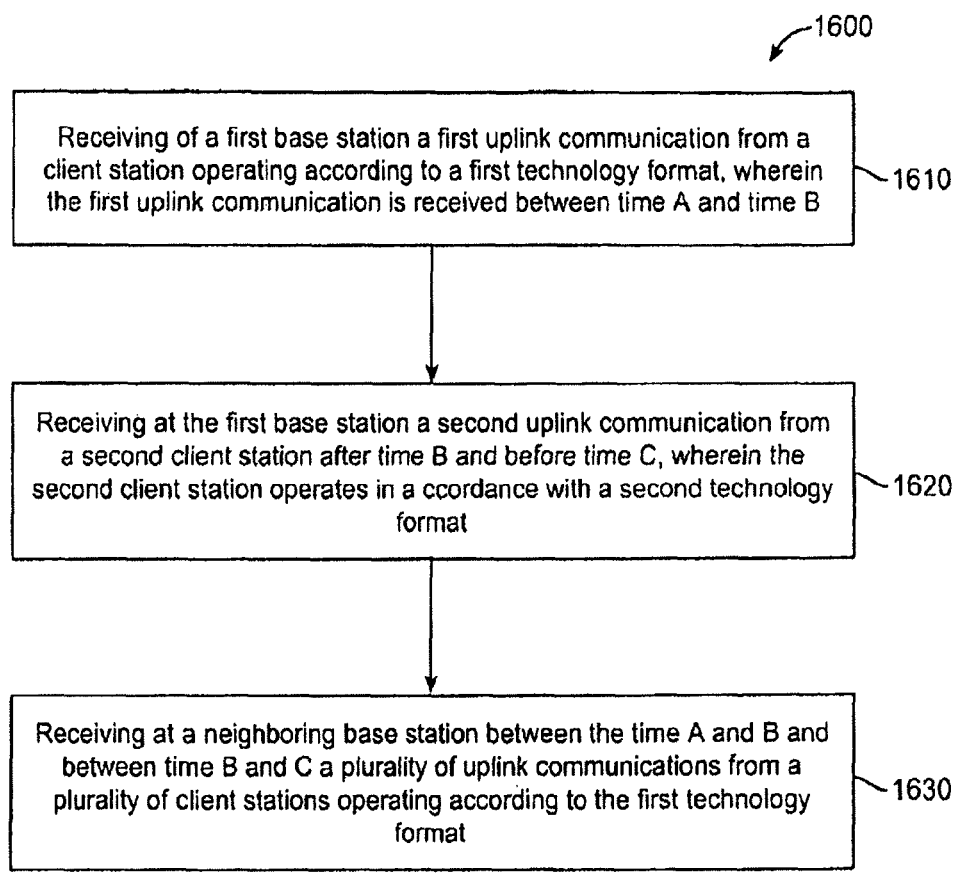
FIG. 16 is a flow chart illustrating a process for using a system that includes both advanced mode enabled base stations and legacy only base stations.

FIG. 16 shows a process 1600 for using a system that includes both advanced mode enabled base stations and legacy only base stations. In block 1610, a first base station receives a first uplink communication from a client station operating according to a first technology format. The first uplink communication is received between time A and B. In block 1620, the first base station receives a second uplink communication from a second client station after time B and before time C, wherein the second client station operates in accordance with a second technology format. In block 1630, a neighboring base station receives, between the time A and B and between time B and C, a plurality of uplink communications from a plurality of client stations operating according to the first technology format.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The steps of a method, process, or algorithm may be embodied in a software module as one or more processor or computer readable instructions encoded in a storage medium executed by a processor, or in a combination of hardware and software. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosed embodiments. Various modifications to these embodiments will be readily apparent to those of ordinary skill in the art, and the generic principles defined herein may be applied to other embodiments without departing from the scope of the disclosure.

What is claimed is:

1. A method of orthogonal frequency division multiple access (OFDMA) communication, the method comprising:
    transmitting a first downlink subframe in a first frequency band according to a first technology format, the first downlink subframe beginning at a first time and ending at a second time, the first downlink subframe comprising a preamble for synchronization, a downlink allocation table (DL-MAP) associated with the first downlink subframe, and an uplink allocation table (UL-MAP);
    transmitting at least one second downlink subframe also within the first frequency band according to a second technology format, the at least one second downlink subframe beginning after the second time and ending at a third time;
    receiving a first uplink subframe in a second frequency band according to the first technology format, the first uplink subframe beginning after the third time and ending at a fourth time; and
    receiving at least one second uplink subframe also within the second frequency band according to the second technology format, the at least one second uplink subframe beginning after the fourth time and ending at a fifth time.

2. The method of claim 1, wherein the second frequency band is the same as the first frequency band.

3. The method of claim 1, wherein the second frequency band is different from the first frequency band.

4. The method of claim 2, wherein the uplink allocation table (UL-MAP) is associated with the time between the third time and the fourth time.

5. The method of claim 3, wherein the uplink allocation table (UL-MAP) is associated with a time interval that occurs after the fifth time.

6. The method of claim 1, further comprising dynamically adjusting an occurrence of at least one of the second time, third time, fourth time or fifth time.

7. The method of claim 1, further comprising transmitting a stand-alone frame header associated with the second technology format after the second time.

8. The method of claim 1, wherein the first uplink subframe begins after a time gap that follows the third time.

9. A method of orthogonal frequency division multiple access (OFDMA) communication, the method comprising:
   transmitting a first downlink subframe in a first frequency band according to a first technology format, the first downlink subframe beginning at a first time and ending at a second time, the first downlink subframe comprising a preamble for synchronization, a downlink allocation table (DL-MAP) associated with the first downlink subframe, and an uplink allocation table (UL-MAP);
   transmitting at least one second downlink subframe within a second frequency band according to a second technology format, the at least one second downlink subframe beginning after the second time and ending at a third time;
   receiving a first uplink subframe in a third frequency band according to the first technology format, the first uplink subframe beginning after the third time and ending at a fourth time; and
   receiving at least one second uplink subframe within a fourth frequency band according to the second technology format, the at least one second uplink subframe beginning after the fourth time and ending at a fifth time.

10. The method of claim 9, wherein:
    the first frequency band is part of the second frequency band;
    the second frequency band is wider than the first frequency;
    the third frequency band is the same as the first frequency band; and
    the fourth frequency band is the same as the second frequency band.

11. The method of claim 9, wherein:
    the first frequency band is part of the second frequency band;
    the second frequency band is wider than the first frequency;
    the third frequency band is part of the fourth frequency band; and
    the fourth frequency band is wider than the third frequency.

12. The method of claim 10, wherein the uplink allocation table (UL-MAP) is associated with the time between the third time and the fourth time.

13. The method of claim 11, wherein the uplink allocation table (UL-MAP) is associated with a time interval that occurs after the fifth time.

14. The method of claim 9, further comprising dynamically adjusting an occurrence of at least one of the second time, third time, fourth time or fifth time.

15. The method of claim 9, further comprising transmitting a stand-alone frame header associated with the second technology format after the second time.

16. The method of claim 9, wherein the first uplink subframe begins after a time gap that follows the third time.

17. A wireless orthogonal frequency division multiple access (OFDMA) base station, the base station comprising a transmitter configured to:
    transmit a first downlink subframe in a first frequency band according to a first technology format, the first downlink subframe beginning at a first time and ending at a second time, the first downlink subframe comprising a preamble for synchronization, a downlink allocation table (DL-MAP) associated with the first downlink subframe, and an uplink allocation table (UL-MAP);
    transmit at least one second downlink subframe within the first frequency band according to a second technology format, the at least one second downlink subframe beginning after the second time and ending at a third time;
    receive a first uplink subframe in a second frequency band according to the first technology format, the first uplink subframe beginning after the third time and ending at a fourth time; and
    receive at least one second uplink subframe also within the second frequency band according to the second technology format, the at least one second uplink subframe beginning after the fourth time and ending at a fifth time.

18. The base station of claim 17, wherein the second frequency band is the same as the first frequency band.

19. The base station of claim 17, wherein the second frequency band is different from the first frequency band.

20. The base station of claim 18, wherein the uplink allocation table (UL-MAP) is associated with the time between the third time and the fourth time.

21. The base station of claim 19, wherein the uplink allocation table (UL-MAP) is associated with a time interval that occurs after the fifth time.

22. The base station of claim 17, further comprising dynamically adjusting an occurrence of at least one of the second time, third time, fourth time or fifth time.

23. The base station of claim 17, further comprising transmitting a standalone frame header associated with the second technology format after the second time.

24. The base station of claim 17, wherein the first uplink subframe begins after a time gap that follows the third time.

25. A wireless orthogonal frequency division multiple access (OFDMA) base station, the base station comprising a transmitter configured to:
    transmit a first downlink subframe in a first frequency band according to a first technology format, the first downlink subframe beginning at a first time and ending at a second time, the first downlink subframe comprising a preamble for synchronization, a downlink allocation table (DL-MAP) associated with the first downlink subframe, and an uplink allocation table (UL-MAP);
    transmit at least one second downlink subframe within a second frequency band according to a second technology format, the at least one second downlink subframe beginning after the second time and ending at a third time;
    receive a first uplink subframe in a third frequency band according to the first technology format, the first uplink subframe beginning after the third time and ending at a fourth time; and
    receive at least one second uplink subframe within a fourth frequency band according to the second technology format, the at least one second uplink subframe beginning after the fourth time and ending at a fifth time.

26. The base station of claim 25, wherein:
    the first frequency band is part of the second frequency band;
    the second frequency band is wider than the first frequency;
    the third frequency band is the same as the first frequency band; and
    the fourth frequency band is the same as the second frequency band.

27. The base station of claim 25, wherein:
    the first frequency band is part of the second frequency band;

the second frequency band is wider than the first frequency;
the third frequency band is part of the fourth frequency band; and
the fourth frequency band is wider than the third frequency.

28. The base station of claim 26, wherein the uplink allocation table (UL-MAP) is associated with the time between the third time and the fourth time.

29. The base station of claim 27, wherein the uplink allocation table (UL-MAP) is associated with a time interval that occurs after the fifth time.

30. The base station of claim 25, further comprising dynamically adjusting an occurrence of at least one of the second time, third time, fourth time or fifth time.

31. The base station of claim 25, further comprising transmitting a standalone frame header associated with the second technology format after the second time.

32. The base station of claim 25, wherein the first uplink subframe begins after a time gap that follows the third time.

33. A wireless orthogonal frequency division multiple access (OFDMA) client station, the client station comprising a transmitter configured to:
receive a first downlink subframe in a first frequency band according to a first technology format, the first downlink subframe beginning at a first time and ending at a second time, the first downlink subframe comprising a preamble for synchronization, a downlink allocation table (DL-MAP) associated with the first downlink subframe, and an uplink allocation table (UL-MAP);
receive at least one second downlink subframe within the first frequency band according to a second technology format, the at least one second downlink subframe beginning after the second time and ending at a third time;
transmit a first uplink subframe in a second frequency band according to the first technology format, the first uplink subframe beginning after the third time and ending at a fourth time; and
transmit at least one second uplink subframe within the second frequency band according to the second technology format, the at least one second uplink subframe beginning after the fourth time and ending at a fifth time.

34. The client station of claim 33, wherein the second frequency band is the same as the first frequency band.

35. The client station of claim 33, wherein the second frequency band is different from the first frequency band.

36. The client station of claim 34, wherein the uplink allocation table (UL-MAP) is associated with the time between the third time and the fourth time.

37. The client station of claim 35, wherein the uplink allocation table (UL-MAP) is associated with a time interval that occurs after the fifth time.

38. The client station of claim 33, further comprising dynamically adjusting an occurrence of at least one of the second time, third time, fourth time or fifth time.

39. The client station of claim 33, further comprising transmitting a stand alone frame header associated with the second technology format after the second time.

40. The client station of claim 33, wherein the first uplink subframe begins after a time gap that follows the third time.

41. A wireless orthogonal frequency division multiple access (OFDMA) client station, the client station comprising a transmitter configured to:
receive a first downlink subframe in a first frequency band according to a first technology format, the first downlink subframe beginning at a first time and ending at a second time, the first downlink subframe comprising a preamble for synchronization, a downlink allocation table (DL-MAP) associated with the first downlink subframe, and an uplink allocation table (UL-MAP);
receive at least one second downlink subframe within a second frequency band according to a second technology format, the at least one second downlink subframe beginning after the second time and ending at a third time;
transmit a first uplink subframe in a third frequency band according to the first technology format, the first uplink subframe beginning after the third time and ending at a fourth time; and
transmit at least one second uplink subframe within a fourth frequency band according to the second technology format, the at least one second uplink subframe beginning after the fourth time and ending at a fifth time.

42. The client station of claim 41, wherein:
the first frequency band is part of the second frequency band;
the second frequency band is wider than the first frequency;
the third frequency band is the same as the first frequency band; and
the fourth frequency band is the same as the second frequency band.

43. The client station of claim 41, wherein:
the first frequency band is part of the second frequency band;
the second frequency band is wider than the first frequency;
the third frequency band is part of the fourth frequency band; and
the fourth frequency band is wider than the third frequency.

44. The client station of claim 42, wherein the uplink allocation table (UL-MAP) is associated with the time between the third time and the fourth time.

45. The client station of claim 43, wherein the uplink allocation table (UL-MAP) is associated with a time interval that occurs after the fifth time.

46. The client station of claim 41, further comprising dynamically adjusting an occurrence of at least one of the second time, third time, fourth time or fifth time.

47. The client station of claim 41, further comprising transmitting a stand alone frame header associated with the second technology format after the second time.

48. The client station of claim 41, wherein the first uplink subframe begins after a time gap that follows the third time.

* * * * *